United States Patent
Levitsky et al.

(10) Patent No.: US 11,695,499 B2
(45) Date of Patent: Jul. 4, 2023

(54) DYNAMIC DEMODULATION REFERENCE SIGNAL CONFIGURATION SIGNALING FOR ADAPTATION WITH DIFFERENT TRANSMISSION MODES

(71) Applicant: QUALCOMM Incorporated, San Diego, CA (US)

(72) Inventors: Michael Levitsky, Rehovot (IL); Peter Gaal, San Diego, CA (US); Muhammad Sayed Khairy Abdelghaffar, San Jose, CA (US); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/364,127

(22) Filed: Jun. 30, 2021

(65) Prior Publication Data
US 2023/0006763 A1    Jan. 5, 2023

(51) Int. Cl.
*H04L 1/00* (2006.01)
*H04W 72/23* (2023.01)
(Continued)

(52) U.S. Cl.
CPC .......... *H04L 1/0025* (2013.01); *H04L 5/0051* (2013.01); *H04W 72/046* (2013.01); *H04W 72/23* (2023.01); *H04W 80/02* (2013.01)

(58) Field of Classification Search
CPC ... H04L 1/0025; H04L 5/0051; H04L 5/0035; H04W 72/046; H04W 72/23; H04W 80/02
(Continued)

(56) References Cited

U.S. PATENT DOCUMENTS

2018/0332572 A1 * 11/2018 Liu .................. H04W 72/04
2021/0337548 A1 * 10/2021 Gao .................. H04L 5/0023
(Continued)

FOREIGN PATENT DOCUMENTS

CN    114051761 A  *  2/2022  .......... H04L 5/0023
EP    3583734 A1      12/2019
(Continued)

OTHER PUBLICATIONS

International Search Report and Written Opinion—PCT/US2022/034367—ISA/EPO—dated Nov. 7, 2022.
(Continued)

*Primary Examiner* — Rownak Islam
(74) *Attorney, Agent, or Firm* — Holland & Hart LLP

(57) ABSTRACT

Methods, systems, and devices for wireless communications are described. A base station communicates with a UE via transmission reception points (TRPs). A UE receives, from a base station, control signaling identifying a set of demodulation reference signal (DMRS) configurations. The UE receives, from the base station, control signaling activating a first DMRS configuration and a second DMRS configuration. The UE receives an indication for the UE to use a first transmission mode of a set of transmission modes to communicate with multiple TRPs of the base station. The UE selects at least one of the first DMRS configuration or the second DMRS configuration based on the indicated first transmission mode and a pre-defined logical association. The UE then receives DMRS signals from the TRPs of the base station, according to the selected at least one of the first DMRS configuration or the second DMRS configuration.

30 Claims, 17 Drawing Sheets

(51) Int. Cl.
   *H04L 5/00*      (2006.01)
   *H04W 72/044*    (2023.01)
   *H04W 80/02*     (2009.01)
(58) Field of Classification Search
   USPC .......................................................... 370/329
   See application file for complete search history.

(56) References Cited

U.S. PATENT DOCUMENTS

2022/0039073 A1    2/2022  Lee et al.
2022/0311574 A1*   9/2022  Gao ...................... H04L 5/0051

FOREIGN PATENT DOCUMENTS

WO    WO-2020122580 A1      6/2020
WO    WO-2021027518 A1 *    2/2021   ........... H04L 5/0048

OTHER PUBLICATIONS

Panasonic: "On Multi-TRP Enhancements for NR MIMO in Rel. 16" 3GPP TSG RAN WG1, R1-1902522_PANASONIC_NR_MIMO_MULTI_TRP_ENHANCEMENTS_VFINAL, 3rd Generation Partnership Project, Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 15, 2019, 12 Pages, XP051600218, Sect. 2.1, figures 1-4.

Qualcomm Incorporated: "Potential Coverage Enhancement Techniques for PUSCH", 3GPP TSG-RAN WG1 Meeting, R1-2009729, 14 Pages, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020, 14 Pages, XP051954373, Sect. 3.2.

* cited by examiner

DYNAMIC DEMODULATION REFERENCE SIGNAL CONFIGURATION SIGNALING FOR ADAPTATION WITH DIFFERENT TRANSMISSION MODES

FIELD OF TECHNOLOGY

The following relates to wireless communications, including dynamic demodulation reference signal (DMRS) configuration signaling for adaptation with different transmission modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic demodulation reference signal (DMRS) configuration signaling for adaptation with different transmission modes. Generally, the described techniques provide for a base station communicating with a user equipment (UE) via one or more transmission reception points (TRPs) based on one or more DMRS configurations. A UE may receive, from a base station, control signaling identifying a set of DMRS configurations. The UE may receive, from the base station, control signaling activating a first DMRS configuration and a second DMRS configuration of the set of DMRS configurations. The UE may receive an indication for the UE to use a first transmission mode of a set of transmission modes to receive communications from multiple TRPs, including a first TRP and a second TRP of base station. The UE may select at least one of the first DMRS configuration or the second DMRS configuration based on the indicated first transmission mode and a set of associations between the set of transmission modes and the set of activated DMRS configurations. The set of associations may indicate that the at least one of the first DMRS configuration or the second DMRS configuration may be associated with the first transmission mode. The UE may then receive DMRS signals from the first TRP and the second TRP of the base station, according to the selected at least one of the first DMRS configuration or the second DMRS configuration.

A method for wireless communication at a user equipment (UE) is described. The method may include receiving control signaling identifying a set of DMRS configurations, receiving control signaling activating a first DMRS configuration and a second DMRS configuration of the set of DMRS configurations, receiving an indication for the UE to use a first transmission mode of a set of transmission modes to communicate with multiple TRPs, including a first TRP and a second TRP, selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode, and receiving DMRSs from the first TRP and the second TRP according to the selected at least one of the first DMRS configuration or the second DMRS configuration.

An apparatus for wireless communication at a UE is described. The apparatus may include a processor, memory coupled with the processor, and instructions stored in the memory. The instructions may be executable by the processor to cause the apparatus to receive control signaling identifying a set of DMRS configurations, receive control signaling activating a first DMRS configuration and a second DMRS configuration of the set of DMRS configurations, receive an indication for the UE to use a first transmission mode of a set of transmission modes to communicate with multiple TRPs, including a first TRP and a second TRP, select at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode, and receive DMRSs from the first TRP and the second TRP according to the selected at least one of the first DMRS configuration or the second DMRS configuration.

Another apparatus for wireless communication at a UE is described. The apparatus may include means for receiving control signaling identifying a set of DMRS configurations, means for receiving control signaling activating a first DMRS configuration and a second DMRS configuration of the set of DMRS configurations, means for receiving an indication for the UE to use a first transmission mode of a set of transmission modes to communicate with multiple TRPs, including a first TRP and a second TRP, means for selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode, and means for receiving DMRSs from the first TRP and the second TRP according to the selected at least one of the first DMRS configuration or the second DMRS configuration.

A non-transitory computer-readable medium storing code for wireless communication at a UE is described. The code may include instructions executable by a processor to receive control signaling identifying a set of DMRS configurations, receive control signaling activating a first DMRS configuration and a second DMRS configuration of the set of DMRS configurations, receive an indication for the UE to use a first transmission mode of a set of transmission modes to communicate with multiple TRPs, including a first TRP and a second TRP, select at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode, and receive DMRSs from the first TRP and the second TRP according to the selected at least one of the first DMRS configuration or the second DMRS configuration.

Some examples of the method, apparatuses, and non-transitory computer-readable medium described herein may further include operations, features, means, or instructions for receiving, via the first TRP and the second TRP, downlink data based on the received DMRSs from the first TRP and the second TRP, where the DMRSs from the first TRP may be transmitted on a same set of resources as the DMRSs from the second TRP.

Some examples of the method, apparatuses, and non-transitory computer-readable medium described herein may further include operations, features, means, or instructions for receiving, via the first TRP and the second TRP, downlink data based on the received DMRSs, where the DMRSs from the first TRP may be transmitted on a different set of resources as the DMRSs from the second TRP.

Some examples of the method, apparatuses, and non-transitory computer-readable medium described herein may further include operations, features, means, or instructions for transmitting an indication of a capability of the UE to use concurrently different DMRS configurations for different TRPs and to receive different DMRS signals concurrently when multi TRP transmission may be used and receiving, at least in part in response to the transmitted indication of the capability, control signaling indicating for the UE to use concurrently the first DMRS configuration for the first TRP and the second DMRS configuration for the second TRP.

Some examples of the method, apparatuses, and non-transitory computer-readable medium described herein may further include operations, features, means, or instructions for receiving an indicator that identifies a DMRS configuration that may be being activated as the first or the second DMRS configuration.

Some examples of the method, apparatuses, and non-transitory computer-readable medium described herein may further include operations, features, means, or instructions for identifying a set of associations between the first and the second activated DMRS configurations of the set of DMRS configurations and a first and a second set of one or more transmission mode options and identifying which DMRS configuration to be assumed at the UE in response to the received indicator and according to the set of associations defining that the first DMRS configuration may be associated with a transmission mode option of the first set of transmission mode options, and that the second DMRS configuration may be associated with a transmission mode option of the second set of transmission mode options.

Some examples of the method, apparatuses, and non-transitory computer-readable medium described herein may further include operations, features, means, or instructions for identifying a set of associations between the first and the second activated DMRS configurations of the set of DMRS configurations and the multiple TRPs and identifying, which DMRS configuration to be assumed per TRP in response to a received indication to switch to a second transmission mode, the received indicator, and according to the set of associations defining that the first DMRS configuration may be associated with the first TRP for the second transmission mode, and that the second DMRS configuration may be associated with the second TRP for the second transmission mode.

In some examples of the method, apparatuses, and non-transitory computer-readable medium described herein, and the method, apparatuses, and non-transitory computer-readable medium may include further operations, features, means, or instructions for identifying, which DMRS configuration to be assumed per TRP in response to a received indication to switch to a second transmission mode, the received indicator, and according to the set of associations defining that the first DMRS configuration may be associated with a first transmission configuration indicator state that corresponds to the first TRP, and defining that the second DMRS configuration may be associated with a second transmission configuration indicator state that corresponds to the second TRP, identifying that the first DMRS configuration may be associated with a first code division multiplexing group of the set of code division multiplexing groups based on the first code division multiplexing group being associated with the first transmission configuration indicator state, and identifying that the second DMRS configuration may be associated with a second code division multiplexing group of the set of code division multiplexing groups based on the second code division multiplexing group being associated with the second transmission configuration indicator state.

In some examples of the method, apparatuses, and non-transitory computer-readable medium described herein, the first and the second DMRS configuration may be valid for the first and the second set correspondingly of one or more transmission modes until a subsequent activating control signaling and the corresponding indicator that activates a different DMRS configuration for the first or the second DMRS configuration or for both of them may be received by the UE.

In some examples of the method, apparatuses, and non-transitory computer-readable medium described herein, a default or a single radio resource control (RRC) configured DMRS configuration may be valid for any transmission mode until receiving the first control signaling activating the first or the second or both DMRS configurations.

In some examples of the method, apparatuses, and non-transitory computer-readable medium described herein, receiving the indication for the UE to use a first transmission mode of the set of transmission modes may include operations, features, means, or instructions for receiving medium access control-control element (MAC-CE) signaling or a downlink control information (DCI) message that includes the indication for the UE to use a first transmission mode of the set of transmission modes.

Some examples of the method, apparatuses, and non-transitory computer-readable medium described herein may further include operations, features, means, or instructions for receiving, from a base station, a control message including an indication that the UE may be to reactivate the first or the second or both DMRS configurations with the corresponding indicator having a first value that may be associated with the first set of transmission modes or the first TRP, where a second value of the indicator may be associated with the second set of transmission modes or the second TRP.

A method for wireless communication at a base station is described. The method may include communicating with a UE via a first TRP and a second TRP of the base station according to a first transmission mode for multiple TRPs, transmitting DMRSs via the first TRP and the second TRP according to a first DMRS configuration of a set of DMRS configurations, transmitting, to the UE, an indication to switch to a second transmission mode for multiple TRPs, and transmitting DMRSs via the first TRP and the second TRP according to a second DMRS configuration of the set of DMRS configurations based on the second transmission mode.

An apparatus for wireless communication at a base station is described. The apparatus may include a processor, memory coupled with the processor, and instructions stored in the memory. The instructions may be executable by the processor to cause the apparatus to communicate with a UE via a first TRP and a second TRP of the base station according to a first transmission mode for multiple TRPs, transmit DMRSs via the first TRP and the second TRP according to a first DMRS configuration of a set of DMRS configurations, transmit, to the UE, an indication to switch to a second transmission mode for multiple TRPs, and transmit DMRSs via the first TRP and the second TRP according to a second DMRS configuration of the set of DMRS configurations based on the second transmission mode.

Another apparatus for wireless communication at a base station is described. The apparatus may include means for communicating with a UE via a first TRP and a second TRP of the base station according to a first transmission mode for multiple TRPs, means for transmitting DMRSs via the first TRP and the second TRP according to a first DMRS configuration of a set of DMRS configurations, means for transmitting, to the UE, an indication to switch to a second transmission mode for multiple TRPs, and means for transmitting DMRSs via the first TRP and the second TRP according to a second DMRS configuration of the set of DMRS configurations based on the second transmission mode.

A non-transitory computer-readable medium storing code for wireless communication at a base station is described. The code may include instructions executable by a processor to communicate with a UE via a first TRP and a second TRP of the base station according to a first transmission mode for multiple TRPs, transmit DMRSs via the first TRP and the second TRP according to a first DMRS configuration of a set of DMRS configurations, transmit, to the UE, an indication to switch to a second transmission mode for multiple TRPs, and transmit DMRSs via the first TRP and the second TRP according to a second DMRS configuration of the set of DMRS configurations based on the second transmission mode.

Some examples of the method, apparatuses, and non-transitory computer-readable medium described herein may further include operations, features, means, or instructions for transmitting, via the first TRP and the second TRP, downlink data, based on transmitting the DMRSs from the first TRP and the second TRP.

Some examples of the method, apparatuses, and non-transitory computer-readable medium described herein may further include operations, features, means, or instructions for transmitting control signaling indicating for the UE to use concurrently the first DMRS configuration and the second DMRS configuration.

Some examples of the method, apparatuses, and non-transitory computer-readable medium described herein may further include operations, features, means, or instructions for transmitting an indication of a correspondence between the first DMRS configuration and the first transmission mode.

Some examples of the method, apparatuses, and non-transitory computer-readable medium described herein may further include operations, features, means, or instructions for transmitting an indication of a correspondence between the second DMRS configuration and the second transmission mode.

Some examples of the method, apparatuses, and non-transitory computer-readable medium described herein may further include operations, features, means, or instructions for transmitting an indication of the set of DMRS configurations, including the first DMRS configuration and the second DMRS configuration.

Some examples of the method, apparatuses, and non-transitory computer-readable medium described herein may further include operations, features, means, or instructions for transmitting control signaling activating the first DMRS configuration.

Some examples of the method, apparatuses, and non-transitory computer-readable medium described herein may further include operations, features, means, or instructions for transmitting control signaling activating the second DMRS configuration.

In some examples of the method, apparatuses, and non-transitory computer-readable medium described herein, the first DMRS configuration corresponds to a first code division multiplexing group, or a first set of DMRS ports, or a combination thereof, and the second DMRS configuration corresponds to a second code division multiplexing group, or a second set of DMRS ports, or a combination thereof.

Some examples of the method, apparatuses, and non-transitory computer-readable medium described herein may further include operations, features, means, or instructions for transmitting first control signaling indicating the first transmission mode, the communicating via the first TRP and the second TRP based on the transmitted control signaling and transmitting second control signaling indicating the second transmission mode, the transmitted indication to switch to the second transmission mode including the transmitted second control signaling indicating the second transmission mode.

In some examples of the method, apparatuses, and non-transitory computer-readable medium described herein, the first control signaling includes MAC-CE signaling, or a DCI message, or a combination thereof and the second control signaling includes MAC-CE signaling, or a DCI message, or a combination thereof, and.

In some examples of the method, apparatuses, and non-transitory computer-readable medium described herein, the first transmission mode includes a first single frequency network transmission scheme with precompensation, a second single frequency network transmission scheme with precompensation, the second single frequency network transmission scheme without precompensation, a dynamic point selection mode, a transparent single frequency network transmission scheme, or a spatial domain multiplexing scheme and the second transmission mode includes the first single frequency network transmission scheme without precompensation, the second single frequency network transmission scheme with precompensation, the second single frequency network transmission scheme without precompensation, the dynamic point selection mode, or the spatial domain multiplexing scheme.

DETAILED DESCRIPTION

Figure 1:
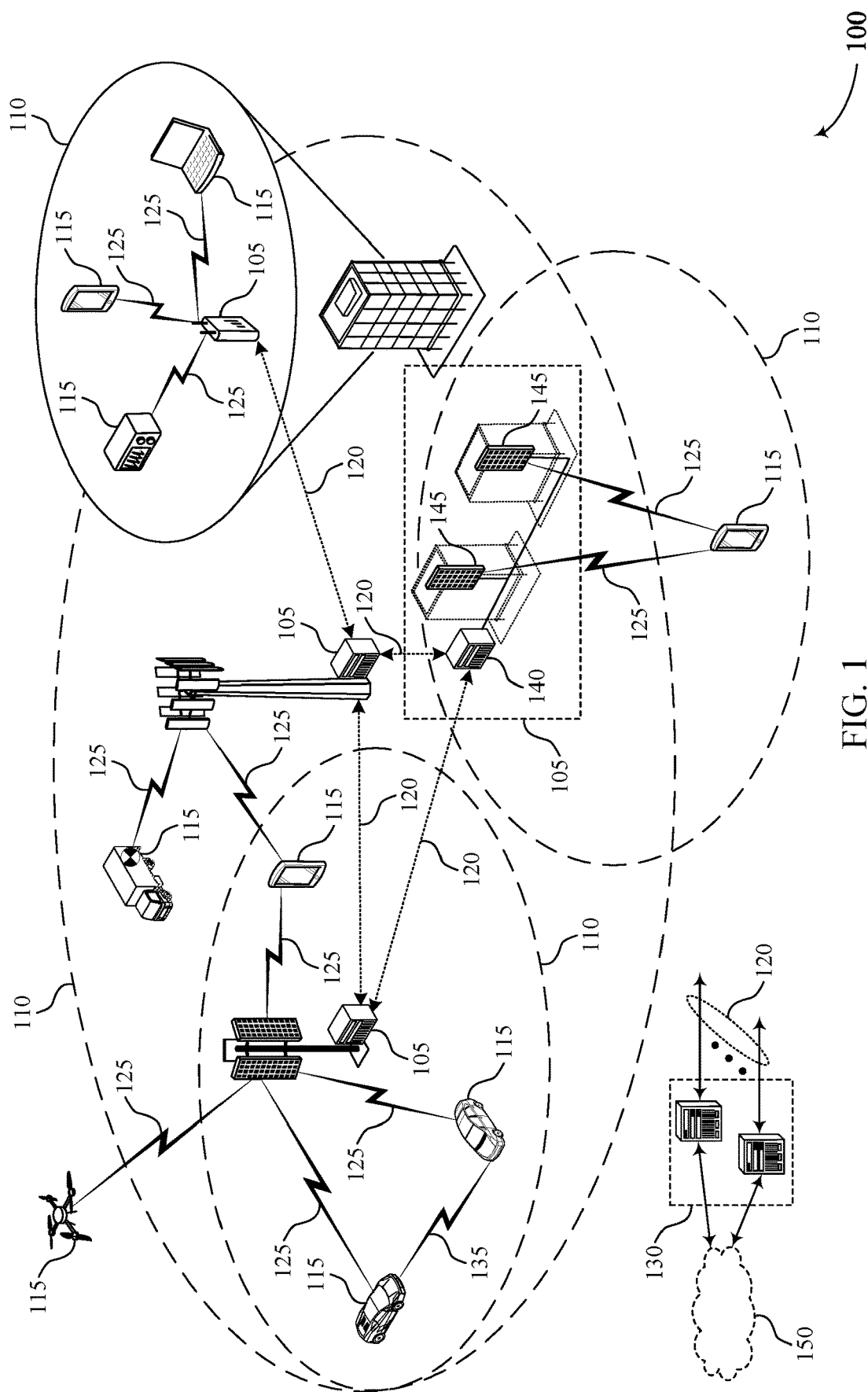
FIG. 1 illustrates an example of a wireless communications system that supports dynamic demodulation reference signal (DMRS) configuration signaling for adaptation with different transmission modes in accordance with aspects of the present disclosure.

In some wireless communications systems, a user equipment (UE) may communicate with other devices, such as transmission and reception points (TRPs), using different communication schemes to increase spectral efficiency or reliability of downlink transmissions. For example, a UE may communicate with TRPs using time division multiplexing (TDM), frequency division multiplexing (FDM), or spatial division multiplexing (SDM) communication schemes or based on dynamic TRP switching. The UE may additionally or alternatively implement a single frequency network (SFN) communication scheme with or without Doppler shift pre-compensation in which a transmission signal may be simultaneously transmitted on a same resources over multiple beams or channels from different TRPs (e.g., for a high speed train (HST) scenario). The UE may transmit reference signals establish or otherwise support data communications with the TRPs. In some cases, a TRP or a base station may dynamically configure (or reconfigure) a demodulation reference signal (DMRS) to be assumed for physical downlink shared channel (PDSCH) reception at the UE, such as by transmitting the corresponding control signaling that dynamically conveys DMRS configuration or reconfiguration. Dynamic DMRS configuration signaling may allow DMRS configuration adaptation to a single TRP or multi-TRP channel and reception conditions. DMRS adaptation may be performed per transmission mode or between dynamically switched transmission modes. A radio resource control (RRC) configured DMRS may become outdated (e.g., or not optimally defined) as channel or reception conditions that the UE experiences change or may be not aligned with the switched transmission mode (e.g., which may change the equivalent channel characteristics), which may cause inefficient communication or a limited communication quality between the UE and one or more TRPs.

As described herein, a UE may operate according to an adaptive DMRS configuration. The adaptive DMRS configuration may include a UE being configured with a set of DMRS configurations, where two or more DMRS configurations may be activated simultaneously or concurrently. The UE may also support dynamic switching between the DMRS configurations. Each of the activated DMRS configurations or in other words DMRS configurations "in use" at a time may be indicated or selected dynamically. For example, the UE may receive media access control-control element (MAC-CE) signaling or via downlink control information (DCI) indicating the change, or the DMRS configuration to be used/reactivated by the UE. The dynamically activated/reconfigured DMRS configurations (DMRS configurations "in use") may each be associated with different transmission modes or different TRPs, and may thus support DMRS adaptation per transmission mode or per TRP via dynamic switching based on associations that will follow a dynamic switching between transmission modes for different TRPs or dynamic switching between TRPs.

Aspects of the disclosure are initially described in the context of wireless communications systems. Aspects of the disclosure are then described with respect to communication scheme diagrams configuration diagrams, and process flows. Aspects of the disclosure are further illustrated by and described with reference to apparatus diagrams, system diagrams, and flowcharts that relate to dynamic DMRS configuration signaling for adaptation with different transmission modes.

FIG. 1 illustrates an example of a wireless communications system 100 that supports dynamic DMRS configuration signaling for adaptation with different transmission modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may communicate with a UE 115 via one or more TRPs. A UE 115 may receive, from a base station 105, control signaling identifying a set of DMRS configurations. The UE 115 may receive, from base station 105, control signaling activating a first DMRS configuration and a second DMRS configuration of the set of DMRS configurations. The UE 115 may receive an indication for the UE 115 to use a first transmission mode of a set of transmission modes to communicate with multiple TRPs, including a first TRP and a second TRP of base station 105. The UE 115 may select at least one of the first DMRS configuration or the second DMRS configuration based on the indicated first transmission mode and a set of associations between the set of transmission modes and the set of DMRS configurations. The set of associations may indicate that the at least one of the first DMRS configuration or the second DMRS configuration may be associated with the first transmission mode. The UE 115 may then receive DMRS signals from the first TRP and the second TRP of the base station 105, according to the selected at least one of the first DMRS configuration or the second DMRS configuration.

Figure 2:
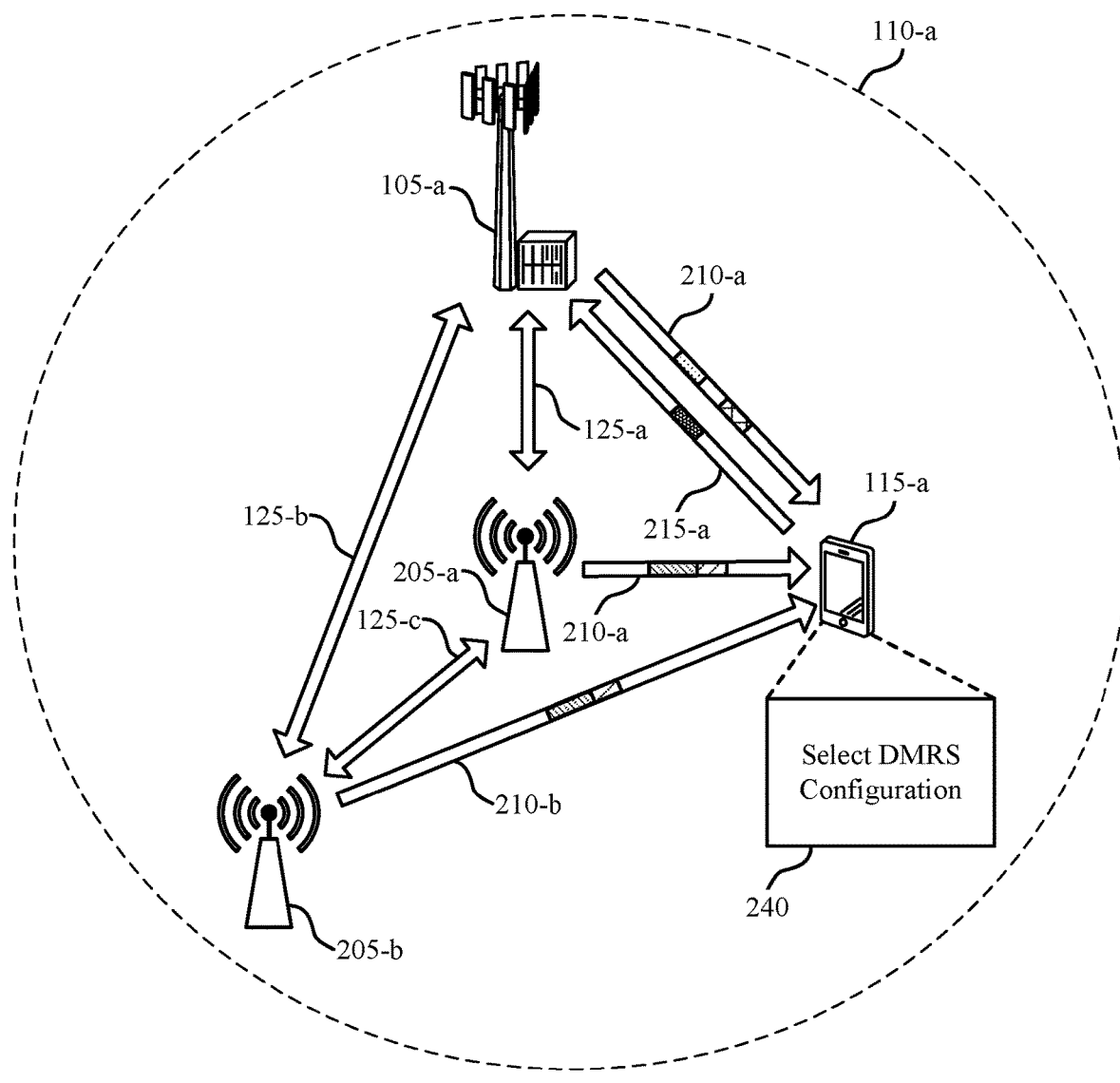
FIG. 2 illustrates an example of a wireless communications system that supports dynamic DMRS configuration signaling for adaptation with different transmission modes in accordance with aspects of the present disclosure.

FIG. 2 illustrates an example of a wireless communications system 200 that supports dynamic DMRS configuration signaling for adaptation with different transmission modes in accordance with aspects of the present disclosure. In some examples, the wireless communications system 200 may implement aspects of the wireless communications system 100 and may include UE 115-*a*, communication link 125-*a* through communication link 125-*c*, and base station 105-*a* with coverage area 110-*a*, which may be examples of a UE 115, communication links 125, and a base station 105 with a coverage area 110 as described with reference to FIG. 1. In some cases, the base station 105-*a* may communicate directly with one or more UEs 115 via a downlink communication link 210, an uplink communication link 215, or both. For example, base station 105-*a* may transmit data or control signaling to UE 115-*a* via downlink communication link 210-*a*, and UE 115-*a* may transmit data or control signaling to base station 105-*a* via uplink communication link 215-*a*. In some other cases, the base station 105 may use one or more TRPs 205 to transmit or relay data or control signaling to the UEs 115.

In some examples, one or more TRPs 205, such as TRP 205-*a*, TRP 205-*b*, or both, may be operating as a base station 105, a network node, or both. A TRP 205 may relay signals between UE 115-*a* and base station 105-*a* via a communication link 125 between base station 105-*a* and the TRP 205 and a downlink communication link 210 between the TRP 205 and UE 115-*a*. For example, TRP 205-*a* may relay data or control signaling from base station 105-*a* to UE 115-*a* via communication link 125-*a* and downlink communication link 210-*b*. Similarly, TRP 205-*b* may relay data or control signaling from base station 105-*a* to UE 115-*a* via communication link 125-*b* and downlink communication link 210-*b*. Additionally or alternatively, the TRPs 205 may relay information from UE 115-*a* to base station 105-*a* via an uplink communication link 215, communication links 125, or both. In some examples, the TRPs 205, such as TRP 205-*a*, TRP 205-*b*, or both, may independently transmit or receive signals from UE 115-*a* (e.g., via a downlink communication link 210, an uplink communication link 215, or both). In some cases, UE 115-*a* may receive control signaling 225-*a* indicating a set of DMRS configurations, or activating a first or second or both DMRS configurations of the set. UE 115-*a* may also receive transmission mode indication, indicating a first transmission mode to use of a set of transmission modes.

In some examples, TRPs 205, base stations 105, or both may communicate with one or more UEs 115 using a communication scheme, such as an SDM scheme, an FDM scheme, a TDM scheme, or a combination. The TRPs 205 may coordinate a transmission of a downlink channel (e.g., a PDSCH, a physical downlink control channel (PDCCH), or both), an uplink channel (e.g., a physical uplink shared channel (PUSCH), a physical uplink control channel (PUCCH), or both). For example, an SDM scheme may involve TRP 205-*a* and TRP 205-*b* performing a joint transmission over a same resource (e.g., over a same set of resource elements and OFDM symbols) based on transmitting different layers, such as spatial layers, with different transmission configuration indication (TCI) states. Additionally or alternatively, an FDM scheme may involve TRP 205-*a* and TRP 205-*b* performing the joint transmissions over different frequency resources and overlapping time resources, such as over different sets of resource elements but over a same set of OFDM symbols, based on transmitting different sets of frequency-domain resources (e.g., resource elements) with different TCI states. In some examples of a TDM scheme, TRP 205-*a* and TRP 205-*b* may perform the joint transmissions over different time resources and overlapping frequency resources, such as over different sets of OFDM symbols and overlapping set of resource elements, based on transmitting different sets of time-domain resources (e.g., OFDM symbols, slots, or mini-slots) with different TCI states.

In some examples, TRP 205-*a* and TRP 205-*b* may perform joint transmissions to UE 115-*a* using an SFN scheme, which may also be referred to as a single frequency communication scheme. The SFN scheme may be a type of multi-TRP or single-TRP communication scheme in which a downlink communication link 210 between a TRP 205 and a UE 115 and a downlink portion of a communication link 125 between the TRP 205 and the base station 105 may include the same frequency bands or channel. For example, TRP 205-*a* and TRP 205-*b* may transmit a same transmission over the same downlink communication link 210 according to an SDM scheme, an FDM scheme, a TDM scheme, an SFN scheme, or the like, where the downlink transmission is associated with two or more TCI states corresponding to the two or more TRPs 205. TRP 205-*a* and TRP 205-*b* may perform joint transmissions to UE 115-*a* according to various types of SFN communication schemes, such as an SFN communication scheme 0, an SFN communication scheme 1, or an SFN communication scheme 2, which is described in further detail with respect to FIG. 3. Receiving UE 115-*a* may use an SDM scheme to give multi-TRPs diversity over a spatial domain, a TDM scheme to give multi-TRPs diversity over a time domain, an FDM scheme to give multi-TRPs diversity over a frequency domain, or an SFN type of transmission to give spatial diversity per layer. In some cases, one or more TRPs 205 configured to use SFN may use beamforming to transmit a signal over one or more beams and may alternatively or additionally transmit a signal in an area, direction, or both. In some examples, the UE 115 may use an SFN scheme if the UE 115 has relatively high mobility, such as in an HST scenario. Further, SFN communications may be useful for some service types, such as broadcast or multicast services.

In some examples, the framework of the SDM scheme and the SFN scheme may be unified such that the UE 115 may support the combined SDM and SFN scheme. For example, the UE 115 may communicate signaling using an SDM scheme or an SFN scheme based on DMRS ports and TCI states. The UE 115 may have multiple DMRS ports, each DMRS port configured with one or more TCI states.

The UE 115 may use an SFN scheme or SDM scheme for communications across multiple TCI states simultaneously using one or more code-division multiplexing (CDM) groups for DMRS ports related to different TRPs. For example, for an SDM scheme, the UE 115 may have a DMRS Port 0 and Port 1 associated with TCI states 1 corresponding to the first TRP and to the first CDM group and a DMRS Port 2 and 3 associated with TCI states 2 corresponding to the second TRP and to the second CDM group.

The UE 115 may apply an SFN scheme to communications across TCI states 1 and 2, which may be referred to as SFNed layer 0 and SFNed layer 1 if two layers transmission is used. In some cases, a quasi-colocation (QCL) for DMRS may be defined by an activated TCI state (e.g., with one or two reference signals/QCL options). In some cases, DMRS ports may follow a corresponding TCI state.

In some examples, a network (e.g., including one or more TRPs 205, a base station 105, one or more UEs 115, or a combination) may support multi-TRP communication, single-TRP communication, or both. For example, as illustrated in wireless communications system 200, TRP 205-*a*, TRP 205-*b*, or both may perform a joint transmission (e.g., multi-TCI or multi-TRP transmission) and signaling to UE 115-*a*, may independently communicate with UE 115-*a* (e.g., may perform a non-joint transmission or single TCI or TRP based transmission), or both. In some examples of multi-TRP communication, the TRPs 205 may communicate with the one or more UEs 115 using different communication schemes (e.g., the SDM multi-TRP scheme, FDM multi-TRP scheme, TDM multi-TRP scheme, or an SFN schemes with or without Doppler shift pre-compensation or a single TRP/TCI based transmission with dynamic transmission point switching). In some cases, these communication schemes may increase spectral efficiency. Two or more transmission scheme options or the corresponding transmission modes may be switched dynamically by the network depending on network loading, UE location, channel conditions, UE speed, UE type and other factors.

A wireless communications system 200 may support the transmission of reference signals to increase an efficiency and a reliability of communications between wireless devices (e.g., a base station 105 and a UE 115). Reference signals may be transmitted from a base station 105 to a UE 115, and vice versa. Reference signals transmitted to a UE 115 may be referred to as downlink reference signal and reference signals transmitted to a base station 105 may be referred to as uplink reference signals. Reference signals may be used by the wireless devices to determine characteristics of a channel. The characteristics of a channel may also be referred to as a channel estimate or channel conditions or channel metrics. Reference signals may include channel state information-reference signal (CSI-RS), downlink DMRS, uplink DMRS, sounding reference signal (SRS), tracking reference signal (TRS), and phase tracking reference signal (PTRS).

A wireless communications system 200 may also support the reporting of information about a channel determined based on reference signals. A UE 115 may use CSI-RS to determine preferred (e.g., optimal) transmission parameters for a channel, such as a preferred precoding matrix, rank, and/or modulation coding scheme (MCS). The UE 115 may determine a preferred transmission parameter based on determining that a transmission parameter will maximize a link efficiency metric (e.g., a spectral efficiency metric), based on a post-processing signal quality ratio (e.g., post-processing signal to interface plus noise ratio (SINR)) and the corresponding estimated spectral efficiency for a channel, or both. The UE 115 may indicate the preferred transmission parameters to a base station 105 in a channel state feedback (CSF) report (which may also be referred to as a channel state information (CSI) report) that may have different formats and may include a precoding matrix indicator (PMI) field that conveys a PMI, a rank indicator (RI) field that conveys an RI, a strongest layer indicator (SLI) field that conveys an SLI; and a channel quality indicator (CQI) field that conveys a CQI. The base station 105 may use the PMI and RI to determine a precoding matrix and rank to use for subsequent transmissions and the CQI to determine an MCS for subsequent transmission.

A UE 115 may use a CSI-RS transmission to determine a channel estimate that is used to assist in link adaptation—e.g., by assisting in the adaptation of transmission parameters. The channel estimate may be used to determine a signal quality ratio (e.g., post-processing signal-to-noise ratio (SNR) or post-processing SINR) for the channel, a delay spread ($\tau_{rms}$) for the channel or a classification of the channel (or channel type), a precoding matrix to use for communications over the channel, a rank to use for communications over the channel, or any combination thereof. A downlink DMRS transmission may also be used by a UE 115 to determine a data channel estimate that may be used to demodulate and decode transmissions received in a data channel. The channel estimate determined using the CSI-RS transmission (e.g., non-precoded reference signal with a 1D or a single symbol allocation pattern per CSI-RS port) may be different than the channel estimate determined using the downlink DMRS transmission (e.g., a precoded reference signal with a 2D allocation pattern per DMRS port). Thus, a downlink DMRS may be transmitted using resources that are associated with data resources allocated to a UE 115. A TRS transmission may be used by a UE 115 for synchronization loops and for determination of mid and long-term characteristics of a channel, such as a Doppler frequency or Doppler shift and Doppler spread or time correlation of the channel, delay spread, and power delay profile and SNR per transmission point.

An uplink DMRS may be used by a base station 105 to determine a channel estimate for an uplink channel between the base station and a UE 115 that transmitted the uplink DMRS (e.g., so the base station 105 can perform coherent demodulation of the PUCCH and the PUSCH). For example, each scheduled PUCCH and PUSCH may have its own DMRS, which may assist the base station 105 with demodulation and decoding. The uplink SRS may be used by a base station 105 for uplink link adaption, uplink transmission parameter selection, uplink channel characteristics estimation like delay spread, Doppler shift and Doppler spread or time correlation of the channel, uplink channel SNR and other uplink measurements, among other uses. In some examples, an uplink SRS may be used by a base station 105 to determine the uplink channel quality over a wide bandwidth so that the base station 105 can perform frequency-selective scheduling for the UE 115 that transmitted the uplink SRS.

A reference signal may be transmitted over communication resources in accordance with a reference signal configuration. A reference signal configuration may indicate which resource elements are allocated to a reference signal transmission—a resource element allocated to a transmission of a reference signal may be referred to as a pilot resource element. A group of resource elements (e.g., contiguous or noncontiguous resource elements) within a symbol period allocated to a transmission of a reference signal may be referred to as a pilot symbol. In some cases, a reference signal configuration explicitly or implicitly indicates a temporal spacing ($D_t$) between resource elements allocated to a reference signal; a frequency spacing ($D_f$) between resource elements allocated to a reference signal; and a power boosting parameter ($\rho_p$) that indicates a power for transmitting the reference signal resource element relative to a power for transmitting a data resource element. Different reference signal configurations may be associated with different combinations of temporal spacing or time domain pattern, frequency spacing or frequency domain pattern, and power boosting—e.g., a first reference signal configuration may be associated with a first temporal spacing or pattern, a first frequency spacing or pattern, and a first power boosting, a second reference signal configuration may be associated with the second temporal spacing or pattern, the second frequency spacing or pattern, and a second power boosting, and so on.

A base station 105 may determine configurations for the different reference signals. In some cases, a base station 105 may configure a UE 115 with a limited or predefined set of DMRS configurations. The base station 105 may then determine a downlink or uplink DMRS configuration for a UE 115 by selecting the DMRS configuration from the set of DMRS configurations. The base station 105 may then signal (e.g., to activate) the selected DMRS configuration to a UE 115 using control signaling or a configuration, such as RRC, DCI based, or MAC-CE based configuration signaling. In some examples, the UE 115 may be semi-statically RRC configured with a pattern (e.g., pilot pattern, resource configuration) for a DMRS 220 that is defined by a DMRS type parameter, a number of DMRS positions parameter, and other DMRS or allocation related parameters. In some examples, a DMRS configuration per allocation may be done explicitly, implicitly, or as a combination of explicit and implicit configuration. An explicit part of the configuration may include DMRS type, the number of DMRS locations, first DMRS symbol location and the max number of DMRS symbols per location configuration. The explicit part of DMRS configuration may be RRC configured. An implicit part of the configuration may include predetermined DMRS symbols locations (time pattern) given the configured for DMRS RRC parameters while the locations are indicated implicitly depending among the rest on a combination of PDSCH mapping type (A or B) plus PDSCH allocation duration (symbols) which are signaled in the allocating (scheduling) DCI. A DMRS spacing in time, or a time domain DMRS pattern, may be based on a predetermined DMRS locations for a combination of a PDSCH and PUSCH mapping type and a PDSCH and PUSCH allocation duration in symbol time units (which may be signaled in a DCI message) and other DMRS or PDSCH and PUSCH related parameters. DMRS boosting may be predefined and fixed for some DCI types and radio network temporary identifier (RNTI) combinations, and for other cases may be signaled by the allocating/scheduling DCI. In some examples, power boosting for a DMRS 220 may be determined based on a DMRS type and number of CDM groups, which in some cases may not convey data. An accuracy of a channel estimate depends on a level of correlation of a channel in time and frequency, input SNR on DMRS resource elements and DMRS configuration or pattern. Channel parameters and SNR conditions may be different for different UEs 115 and may also vary in time. Thus, different DMRS configurations may be used to maximize a spectral efficiency of a link for different channel and SNR conditions.

In some examples, the UE 115 may select a DMRS configuration option using spectral efficiency maximization criteria per given channel characteristics, such as $\tau_{rms}$, Doppler characteristics of the channel ($f_D$), and input (thermal) SNR ($SNR_{in}$). The UE 115 may determine SINR values for each available downlink DMRS configuration candidate. In some examples, the UE 115 may determine a preferred downlink DMRS configuration of the downlink DMRS configurations that maximized a communication efficiency metric for the channel. For example, the UE 115 may determine the downlink DMRS configuration that maximizes spectral efficiency for the channel based on Equation 1:

$$\operatorname*{argmax}_{i=1:N}\left(N_{RE\_data}(\text{DMRS\_i}) \cdot \sum_{l=1:R} C_{QAM}(\bar{\gamma}_l(\text{DMRS\_i}))\right)$$

where $C_{QAM}$ may be the constrained capacity function for a maximal allowed modulation order (e.g., for a quadrature amplitude modulation (QAM) order or any other non-square constellation) that gives the estimated spectral efficiency per resource element per layer; $N_{RE\_data}$ may be the number of data resource elements per resource allocation (or per resource block across the assumed number of OFDM symbols); DMRS_i may be the downlink DMRS configuration candidate defined by a combination of parameters ($D_t$, $D_f$, $SNR(\rho_p)$). And $\bar{\gamma}_l(\gamma_{DMRS\_i})$ may be the average post-processing SINR per layer l. for a corresponding downlink DMRS configuration DMRS_i. $N_{RE\_data}$ may be a function of $D_t$ and $D_f$ (or the corresponding DMRS overhead) of the corresponding downlink DMRS configuration DMRS_i.

A result of Equation 1 may output an argument k that results in a largest value for the equation inside of the outermost (largest) set of parenthesis shown in Equation 1. The argument k that corresponds to the largest value may also correspond to the kth downlink DMRS configuration candidate DMRS_k. In some cases, two downlink DMRS configurations that are associated with the same SINR value may result in different outcomes for the equation inside of the outermost set of parenthesis shown in Equation 1—e.g., the one of the two downlink DMRS configurations that uses additional resource elements may result in a smaller value. For similar reasons, a downlink DMRS configuration that has a larger SINR may result in a smaller value than a downlink DMRS configuration that has a smaller SINR. Similar equations may be used to determine which of the downlink DMRS configurations will maximize other communication metrics for a channel.

In some examples, a UE 115 may assist in DMRS adaptation in downlink. That is, the DMRS selection for downlink may be performed by the UE 115 as a part of downlink communication link 210 adaptation procedures based on CSI-RS processing, DMRS processing, or both. In some examples, $f_d$, $\tau_{rms}$, and $SNR_{in}$ corresponding to the effective downlink channel characteristics may be estimated based on a TRS, a CSI-RS, a DMRS, or a combination thereof.

In some other examples, the UE 115 may receive dynamic signaling of a DMRS configuration in downlink, uplink, or both for a single TRP 205.

For example, the UE 115 may perform MAC-CE based activation and complementary DCI based selection of one of the activated DMRS options. A base station 105 or other network entity may configure a number of DMRS configurations, such as in a DMRS configuration table, to be addressed in downlink (e.g., via RRC signaling). The DMRS configuration may account for network scheduling patterns or preferences and UE capabilities. Several DMRS configurations from the configured table may be activated by MAC-CE (synchronous, short latency). Reactivation may be done dynamically and may follow long term DMRS adaptation process. The activated DMRS options may be addressed as a code points for complementary DCI based selection (e.g., with a new DCI field, DCI type, DCI format, or a combination thereof). For each allocation, the scheduling DCI may select or otherwise signal one of the activated DMRS options. Usage of different activated DMRS options for different allocations may allow a higher flexibility for the network scheduler and an increased level of adaptation for different scheduling scenarios (e.g., slot based or mini slot based scheduling, MU-MIMO scenarios, PDSCH and downlink reference signal or other downlink logical channels multiplexing). The UE 115 may use a default predefined DMRS configuration option before entering a connected mode and before a first activation of a DMRS configuration option.

In some cases, the UE 115 may activate a single DMRS configuration that is signaled by MAC-CE. For example, one of the RRC configured DMRS configuration options (e.g., from the DMRS configurations table) may be dynamically activated or selected by the base station 105 or network entity using MAC-CE signaling (synchronous, short latency). Dynamic reactivation may follow the DMRS adaptation process. The base station 105 and the UE 115 may use the activated DMRS configuration option until re-selection or re-activation of another option (e.g., with no additional DCI based signaling).

In some examples, the UE 115 may perform a two-step DMRS adaptation procedure. The periodic or semi-persistent CSF report may carry a DMRS configuration change request. In some cases, the reported CSF may be consistent with a DMRS configuration determined or used on the CSI reference slot. The DMRS configuration change request may trigger an extended aperiodic CSF and DMRS report scheduling. The CSF provided in the CSF and DMRS report may be consistent with one or more of the selected or reported DMRS options. In some cases, the network may suggest or configure multiple extensions for aperiodic CSF and DMRS reporting. For example, the multiple extensions may be per sub-band, per transport block (TB), per TRP 205 or per CDM group, per transmission mode (e.g., single TRP or multi-TRP, non-SFN, such as SDM, TDM, FDM, or multi-TRP schemes, SFN multi-TRP scheme 0, 1, or 2, with or without Doppler pre-compensation, etc.).

In some examples, a base station 105 or other network entity may control a list of DMRS hypotheses. The base station 105 may configure a UE 115 with a list of DMRS options to be addressed in DMRS selection and reporting (e.g., according to network scheduler preferences). An extended aperiodic DMRS and CSF report may be dynamically re-configured through CSI-RS trigger state options, which may include new configuration fields. In some examples, the UE 115 may select a preferred DMRS configuration for DMRS 220 as part of CSF evaluation. For example, the UE 115 may average SINR across resource elements per stream (e.g., for a selected PMI, RI hypotheses) according to Equation 2:

$$\overline{\gamma}_l(p) = \frac{1}{N_{alloc}} \sum_{k=1}^{k=N_{alloc}} f(\hat{\gamma}(p, k, l))$$

where p is a selected PMI(RI) option, l is the stream index (l=1, . . . , RI), k is the resource element index, and f( ) is an optional transformation weighting applied to $\hat{\gamma}(p, k, l)$ prior to taking the average. Once the SINR is averaged, the UE 115 may perform a CSI-RS post processing SINR mapping to corresponding DMRS post processing SINR equivalents (e.g., performed per layer). For example, the post processing SINR mapping may be from one pilot configuration option to another given channel characteristics. Finally, the UE 115 may perform DMRS configuration option selection using a modified spectral efficiency maximization criteria according to Equation 1 (e.g., per group of layers, CDM, TRP 205, TB, transmission mode, transmission scheme, or a combination thereof).

In some examples, a UE 115 may receive a fixed RRC configured DMRS parameters from a base station 105. For example, a DMRS configuration per allocation may be performed as a combination of explicit and implicit configuration. The explicit part of the configuration may include the main DMRS parameters, such as DMRS type, number of DMRS locations, first DMRS symbol location, and the maximum number of DMRS symbols per location, which may be RRC configured. The implicit part of the configuration may include predetermined DMRS symbols locations (e.g., time pattern) given the configured DMRS RRC parameters that are defined implicitly by a combination of PDSCH mapping type (e.g., A or B), PDSCH duration (e.g., in symbols) and other parameters which may be signaled implicitly in the allocating DCI. In some cases, DMRS resource element boosting may be predefined and fixed for some DCI types, RNTI combinations, or both, or may be signaled implicitly by the allocating DCI based on implicitly signaled number of CDM groups without data.

In some cases, RRC reconfiguration may be a nonsynchronous mechanism that involves several hundreds of milliseconds (ms) of latency for reconfiguration. During the reconfiguration period there may be an uncertainty on the base station 105 or network side regarding the currently addressed UE side configuration. For this reason, there may not be a practical way to convey RRC reconfiguration (e.g., DMRS adaptation) without introducing link interruption. Channel estimation accuracy may depend on the level of correlation of the channel in time and frequency, working SNR point of a UE 115, and on the pilot grid option (e.g., used for chest 2D plot grid). Channel parameters and SNR conditions may be different per UE 115 and may vary in time depending on channel scenario, UE type and allocation scenario, such as HST scenario or non-HST scenario, whether the UE 115 is static or mobile, whether the UE 115 is relatively close to the base station 105 or residing at a cell edge (e.g., the edge of coverage area 110-a), a single TRP or multi-TRP transmission with a different transmission mode option and with or without Doppler pre-compensation, and other factors. Different channel and SNR conditions and transmission mode options and scenarios may use different pilot configuration options in order to maximize spectral efficiency of a link per UE 115. Using fixed DMRS configuration at the base station 105 may cause a network to trade off from in advance between average pilots overhead and the performance of the UE 115. Thus, extra resource elements may be wasted for unnecessary pilots, in some cases, while in other cases UE performance may be floored due to improper pilot configuration.

In some examples, a UE 115 and base station may adopt an adaptive DMRS approach with UE-assisted DMRS selection and dynamic signaling of DMRS configuration per allocation or per some time period. An HST-SFN scenario that assumes multi TRP based transmission in SFN manner to a UE having a high mobility may be associated with extreme channel conditions that may be difficult to perform channel estimation for. The UE 115 and the network may use transmission techniques including SFN transmission scheme 1 and SFN transmission scheme 2 with and without Doppler shift pre-compensation. These techniques may be added to a portfolio of available options for the HST scenario, such as dynamic transmission point switching (DPS) technique with a single TRP based transmission, transparent SFN transmission with a transparent multi TRP transmission (e.g., SFN scheme 0), a multi TRP transmission with SDM, FDM, TDM, or a combination thereof. The different techniques may cause different equivalent Doppler spread and Delay spread characteristics from the perspective of a UE receiver per UE location and UE speed scenario. Correspondingly, it may be beneficial to use a different DMRS configuration for similar SNR conditions, UE speed, and multi-TRP channel realization but with different transmission techniques.

In some cases, the UE 115 and the base station 105 may assume different HST-SFN techniques may be employed dynamically depending on UE location (e.g., between the two closest TRPs 205), UE type (e.g., a customer premises equipment (CPE) mounted on the train, a pedestrian UE 115 on the train, or a static UE 115 on the station), channel conditions, network loading, applicability of a Doppler shift pre-compensation and its accuracy, as well as other factors. The dynamic usage of different HST-SFN techniques may bring an additional potential or value for DMRS adaptation in addition to a basic concept of adaptive DMRS selection as a function of channel characteristics and SNR for a transmission technique (e.g., a single TRP transmission in sub 6 GHz). In some examples, the UE 115, the base station 105, or both may use an extension of a dynamic signaling approach for joint signaling of DMRS 220 with a variety of transmission techniques suggested for HST-SFN scenarios. For example, the base station 105 may transmit a joint MAC-CE based dynamic signaling of DMRS configuration and HST-SFN transmission mode indicators or a joint DCI based signaling of DMRS configuration and HST-SFN transmission mode indication to enable DMRS adaptation in conjunction with a variety of dynamically switched HST-SFN transmission modes. The UE 115 and base station 105 may perform joint MAC-CE based or DCI based dynamic signaling for DMRS adaptation with a multi-TRP transmission scenario or a single TRP transmission mode.

In some examples, the network, such as the base station 105, one or more TRPs 205, or the UE 115, may apply a Doppler shift pre-compensation for each TRP 205 or for one of the TRPs 205 based on Doppler shift signaling by a UE 115 per TRP 205. The UE 115 may measure the Doppler shift based on a corresponding TRS and may indicate the measured Doppler shift explicitly (e.g., via Doppler shift reporting) or implicitly (e.g., based on an SRS transmission performed based on the estimated Doppler shifts per TRP 205 or based on Doppler shift estimated for one of the TRPs 205) to the network. Pre-compensation may be applied to one of the TRPs 205 such that the Doppler shift associated with the TRP 205 on the receiver side may equal a Doppler shift of another TRP 205. In some cases, a pre-compensation mode may be enabled or disabled dynamically depending on Doppler shift measurements accuracy, network or UE mismatches, continuous Doppler shift pre-compensation ability, UE location, channel conditions, TRS or SRS overhead, etc. For example, a DCI or MAC-CE signaling may enable or disable pre-compensation dynamically.

In some examples, the base station 105, the one or more TRPs 205, or the UE 115 may dynamically switch between an SFN transmission scheme and a DPS scheme or an SDM, FDM, or TDM transmission scheme. For example, the switching may be performed based on DCI or MAC-CE signaling. In some cases, the network may use the dynamic switching of transmission mode (e.g., SFN, DPS, SDM) depending on network loading, UE location, channel conditions, whether the UE 115 is on the train or on the station, or a combination thereof. Different transmission scheme options may be associated with different DMRS configurations. The preferred DMRS option per transmission scheme or transmission mode may vary in time depending on UE speed, UE location, and channel conditions. In some cases, multiple (e.g., two) different DMRS configurations may be addressed simultaneously for different TRPs 205.

In some cases, a different DMRS configuration preference may be associated with an HST-SFN transmission scheme (e.g., scheme 1) with and without Doppler shift pre-compensation because of a different equivalent Doppler spread of a resulting SFN channel on DMRS ports. In some examples, a non-compensated HST-SFN case and pre-compensated HST-SFN case may be considered as two different scenarios for DMRS adaptation. Each case may be associated with a different DMRS configuration option for a similar scenario of HST-SFN geometry and similar channel and reception condition characteristics. Different preferred (e.g., optimal) DMRS configurations may be observed for scenarios with and without pre-compensation. In some cases, without pre-compensation DMRS configuration preference may vary depending on UE speed, location, and SNR because of SFN channel characteristics dynamics related to a "breathing" Doppler spectrum and power delay profile. In some other cases, a with pre-compensation multi-TRP SFN channel may be translated to a single TRP channel equivalent at least in terms of Doppler spectrum or Doppler spread and DMRS preference for the channel may have a relatively low dependence on UE speed and location.

In some cases, for an HST-SFN transmission scheme with accurate Doppler shift pre-compensation, for a clustered delay line (CDL) channel type with a strong line of sight (LOS) component, DMRS patterns with one or two DMRS symbols may be a preferred choice. In some other cases, for non-pre-compensated HST-SFN transmission schemes, a preferred DMRS configuration choice may vary between patterns with two, three, and four DMRS symbols depending on UE speed, UE location, and SNR per TRP. In some examples, DMRS preference without Doppler shift pre-compensation may have a relatively strong dependence on UE speed and UE location and may be expected to change quickly for the HST-SFN scenario. In some cases, the network may assume UE assisted DMRS reporting with relatively high reporting rate. Additionally or alternatively, the network may assume that the network may manage a DMRS pattern selection based on UE speed, a Doppler shift indication from a UE 115 per TRP 205, UE location, and operational downlink MCS. DMRS preference with accurate pre-compensation may have a relatively weak dependence (e.g., no dependence) on UE speed and location. However, the HST-SFN transmission scheme (e.g., scheme 1) scenario with Doppler shift pre-compensation may be sensitive to pre-compensation accuracy, such as estimation accuracy and level of persistence of the indicated Doppler shifts. Non ideal and variable accuracy may introduce dynamics in preferred DMRS pattern selection for the scenario as well. Thus, UE assisted DMRS adaptation may be beneficial also for HST-SFN transmission scheme 1 with pre-compensation.

In some examples, for HST-SFN transmission scheme 1, a TRS may be transmitted in TRP-specific or a non-SFN manner. A DMRS 220 and PDSCH from TRPs 205 may be transmitted in an SFN manner. Each DMRS port may have two TCI states (e.g., a quasi-colocation (QCL) configuration or assumption may be with TRSs from multiple TRPs 205) and may experience a combined SFN channel. In some cases, there may be a different time-domain correlation for a DMRS 220 with and without pre-compensation. For example, without pre-compensation, the time domain correlation (or the equivalent Doppler spread of the SFN channel per DMRS port) may be a function of UE speed and UE location between TRPs 205. In some other examples, with accurate pre-compensation, the time domain correlation may not depend on UE speed and UE location relative to TRPs 205 and the time correlation of the channel may also remain high since SFN channel may be translated to a single TRP channel equivalent in terms of time correlation and Doppler spread per DMRS port (e.g., CDL channel type with two dominant channel impulse response (CIR) taps with a similar or the same Doppler shift after the pre-compensation assuming that each TRP has CDL channel type with a strong LOS component).

In some cases, each TRP 205 may be associated with a different DMRS configuration preference, since channel associated with each TRP may have a different characteristics such as a different Doppler spread, delay spread, and SNR per TRP 205. Different DMRS configuration preference per TRP 205 may be relevant for an HST-SFN transmission scheme (e.g., scheme 2). Multiple DMRS configuration options (e.g., two) may be used simultaneously for DMRS ports associated with different TRPs. With a CDL channel model and a LOS assumption (e.g., if the UE is a train mounted CPE), the DMRS preference per TRP 205 may be similar between TRPs 205 and may have a relatively slow or weak dependence on UE speed and UE location relative to the TRP 205. However, in case of a channel profile with a relatively less dominant LOS (e.g., a pedestrian UE on the train) or non-LOS (NLOS) channel type, DMRS preference per TRP 205 may be different and DMRS reselection may be more dynamic. Different DMRS patterns may release, or free, some portion of resource elements for data allocation. Otherwise, relatively denser DMRS preferences between TRPs 205 may be used for both TRPs 205).

In some examples, for HST-SFN transmission scheme 2, a TRS and a DMRS 220 may be transmitted in TRP-specific or a non-SFN manner. The PDSCH from TRPs 205 may be transmitted in SFN manner. Each DMRS port may be transmitted by a single TRP 205 and may have a TCI state corresponding to the TRP 205. The DMRS ports associated with each TRP 205 may be transmitted on different CDM groups (e.g., Ports of a TRP 205 on different CDM groups, such as Port 0 and Port 1 of TRP 205-*a* on a first CDM and Port 2 and Port 3 of TRP 205-*b* on a second CDM). Each DMRS port may experience a channel associated with a single corresponding TRP 205. In some cases, there may be different time domain correlation for DMRSs on different CDM groups (e.g., for different TRPs 205). In some cases, such as for scheme 2 or any other case with a non SFN transmission of DMRS, the effective time domain correlation for a DMRS 220 (or for a channel interpolation in time per DMRS port) may be the same with and without pre-compensation (e.g., assuming that the corresponding carrier frequency offset (CFO) or Doppler shift may be estimated based on a DMRS 220 or a TRS or synchronization signal block (SSB) associated with the corresponding TRP and may be removed prior to channel time interpolation operation (with CDL channel assumption and a dominant LOS component), such that the effective time correlation of DMRS ports may not be sensitive to any non-pre-compensated Doppler shift). Thus, in some cases, the time correlation for a DMRS 220 may not depend or almost not depend on employment of Doppler shift pre-compensation and on UE speed and UE location between TRPs 205 (assuming CDL channel with a dominant LOS component per TRP 205).

In some examples, for a DPS transmission scheme, each TRP 205 may be associated with a different DMRS configuration preference, since channel associated with each TRP may have a different characteristics such as a different Doppler spread, delay spread, and SNR per TRP 205. With a CDL channel model and a LOS assumption (e.g., if the UE is a train mounted CPE), a DMRS preference per TRP 205 may be similar between TRPs 205 and may have a relatively weak dependence on UE speed and UE location relative to the TRP 205. In addition, the DMRS preferences per TRP 205 may be similar to the DMRS preference for the same TRP 205 with HST-SFN transmission scheme 2 or with any other scheme with a non SFN type of transmission of DMRS ports (e.g., single TRP channel is experienced per DMRS port and the same channel and SNR characteristics for channel estimation based on the corresponding DMRS per TRP 205 may be assumed even if a different transmission schemes are applied). Dynamic switching between HST-SFN transmission scheme 2 and DPS may rely on the same DMRS configuration preference per TRP 205. In some cases, for dynamic switching between HST-SFN transmission scheme 1 and DPS, a DMRS preference for DPS may be similar to a DMRS preference for HST-SFN transmission scheme 1 with pre-compensation (e.g., because pre-compensation translates an SFN channel into a single TRP channel equivalent).

In some cases, the DPS transmission scheme may include a single TRP 205 and a corresponding associated single TCI transmission (e.g., from a UE perspective). In some examples, a different TRP 205 may be used as an active transmitter of a downlink message to the UE 115 based on a UE location. A TRS, a DMRS, and PDSCH may be transmitted in TRP-specific or non-SFN manner. Each DMRS port may be transmitted by a TRP 205 and may experience channel associated with a TRP 205. In some cases, there may be a different time domain correlation or other channel characteristics for a DMRS 220 when transmitted from different TRPs 205 according to the DPS transmission scheme. Doppler shift may be addressed by a frequency tracking loop (FTL) on the UE side as usual in case of a single TRP transmission. In some cases, the time domain correlation for the DMRS 220 per TRP 205 may depend on UE speed and UE location between TRPs 205 assuming a non near LOS channel type per TRP.

In some examples, for an SDM, FDM, or TDM transmission scheme, each TRP may be associated with a different DMRS configuration preference (e.g., a different Doppler spread, delay spread, and SNR per TRP 205). In some cases, multiple DMRS configuration options (e.g., two) may be used simultaneously for DMRS ports associated with different TRPs 205. Dynamic switching between an SDM transmission scheme and the HST-SFN transmission scheme 2 may rely on a same DMRS preference per TRP 205. In some cases, DMRS preferences per TRP 205 for an SDM transmission scheme may be close to a DMRS preference for HST-SFN transmission scheme 1 with pre-compensation. In the case of dynamic switching between two transmission schemes (SDM and scheme 1), a common DMRS preference may be assumed (e.g., with an accurate pre-compensation assumption for scheme 1).

In some cases, for the SDM transmission scheme, a TRS and a DMRS 220 may be transmitted in TRP-specific or non-SFN manner. A PDSCH from TRPs 205 may be transmitted in an SDM mode (e.g., a same continuous transmission in parallel on different spatial layers). Each DMRS port may be transmitted by a single corresponding TRP 205 and may have a single TCI state association corresponding to one of the TRPs 205. The DMRS ports associated with each TRP 205 may be transmitted on different CDM groups. Each DMRS port may experience a channel associated with a single TRP 205. In some cases, there may be a different time domain correlation or other channel characteristics and SNR for a DMRS 220 on different CDM groups (e.g., TRPs 205). The time domain correlation for a DMRS 220 within a CDM group may be the same with and without pre-compensation (e.g., assuming CFO estimation based on TRS/SSB or other non SFN pilot and its removal from the DMRS 220 prior to channel estimation and interpolation in time in case that Doppler shift pre-compensation is not employed). Time domain correlation for a DMRS may depend on a UE speed and a UE location between TRPs 205 assuming non near LOS channel type per TRP 205.

In some cases, a TRP 205 or a base station 105 may transmit a DMRS configuration to the UE, such as by transmitting RRC signaling including an indication of the configuration. The semi-statically configured DMRS may become outdated (or not optimally defined) as channel or reception conditions that the UE 115 experiences are changing or may not be aligned with the switched transmission mode, which may change equivalent channel characteristics.

UE 115-*b* may receive two or more DMRS configurations to support dynamic switching between different transmission modes (with DMRS adaptation to a used transmission mode). UE 115-*b* may receive an indication regarding a list of DMRS configurations to be addressed in control signaling 225-*a*. Each one of the DMRS configurations may be activated by control signaling 225-*b*. Different activated DMRS configurations (e.g., a two activated DMRS configurations) may be associated with different dynamically switched HST-SFN transmission modes (this may allow to adopt DMRS to a dynamically switched transmission modes). Each one of the DMRS configurations may be selected/reactivated dynamically and may follow DMRS adaptation process in time allowing to adopt DMRS also for a given transmission mode. In some cases, the DMRS adaptation via dynamic reactivation of one or more DMRS configuration options (dynamic selection of the most appropriate DMRS configuration for one or more transmission modes) may be assisted by UE 115-*b*.

For example, UE 115-*b* may report a DMRS configuration preference per transmission mode, per TRP 205 or both given the corresponding estimated channel characteristics and SNR per TRP 205. Additionally or alternatively, the network may manage a dynamic DMRS option selection per transmission mode and per TRP 205 based on UE speed, a Doppler shift indication from a UE 115 per TRP 205, UE location, operational downlink MCS, other channel measurements per TRP 205 based on SRS or a combination thereof. For example, base station 105-*a* may manage a dynamic DMRS option per transmission mode based on the speed of UE 115-*a*, the Doppler shift from UE 115-*a* for TRP 205-*a*, TRP 205-*b*, or both, the location of UE 115-*a*, the MCS that is used in downlink transmission to a UE 115-*a*, or a combination thereof. Since different HST-SFN transmission modes may be associated with a different DMRS preference, and since HST-SFN transmission mode switching may be performed dynamically (e.g., via MAC-CE or DCI based transmission mode switching), the UE 115-*a* and base station 105-*a* may support joint dynamic signaling of a DMRS configuration and a transmission mode indication (e.g., HST-SFN transmission mode indication). In some examples, the dynamic signaling may involve transmitting the DMRS configuration and the transmission mode indication via a MAC-CE. In some other examples, the dynamic signaling may involve transmitting the DMRS configuration and the transmission mode indication via a DCI message.

In some examples, UE 115-*a* may receive control signaling 225-*a* from base station 105-*a* via downlink communication link 210-*a*. The control signaling 225-*a* may indicate a set of DMRS configurations. In some cases, control signaling 225-*a* may be RRC signaling or configuration that configures UE 115-*a* with the transmission mode indicators or transmission mode option and the set of a corresponding DMRS configurations. UE 115-*b* may also receive control signaling 225-*b* indicating an activation of the two or more DMRS configurations. A list of DMRS options may be configured to a UE 115 (e.g., RRC configured) or predefined via a table in a specification based on UE capability. In some examples, two DMRS options from the list may be activated by a MAC-CE (each MAC-CE having indicator bit=0/1). There may be a predefined set of associations between transmission modes and DMRS options activated with indicator bit set to 1 (or set to 0 accordingly). Another option may be to configure or indicate the associations using control signaling 225 (e.g., RRC signaling).

The transmission modes set may include one or more transmission schemes, such as HST-SFN transmission scheme 1 or 2 with or without Doppler pre-compensation, SFN scheme 0, an FDM scheme, a TDM scheme, an SDM scheme, DPS, or the like. In some cases, UE 115-*a* may indicate additional capability to support two different DMRS configurations or transmissions simultaneously for the same multi-TRP allocation while each one of the DMRS transmissions is performed by one of the involved TRPs 205 that use a different DMRS configuration.

In some examples, once base station 105-*a* receives the capability information 235 from UE 115-*a*, base station 105-*a* may transmit additional control signaling 225-*b*. In some other examples, UE 115-*a* may not transmit the capability information 235, and base station 105-*a* may transmit control signaling 225-*b* independent of the capability information 235. Base station 105-*b* may transmit the information in control signaling 225-*b* dynamically, such as via a MAC-CE, a DCI message, a combination, or the like. In some examples, at 240, UE 115-*a* may select a DMRS configuration of either the first activated DMRS configuration or the second activated DMRS configuration based on control signaling 225-*b*. For example, UE 115-*a* may select the DMRS configuration based on the indicated first transmission mode and a set of associations between the set of transmission modes and the set of activated DMRS configurations. The set of associations may indicate that either the first activated DMRS configuration or the second activated DMRS configuration may be associated with the first transmission mode.

UE 115-*b* may then receive DMRSs 220 from TRPs 205-*a* and 205-*b*, according to the activated DMRS configurations and the transmission mode indication. UE 115-*b* may receive downlink data messages from base station 105-*a* with the DMRSs 220.

Figure 3A:
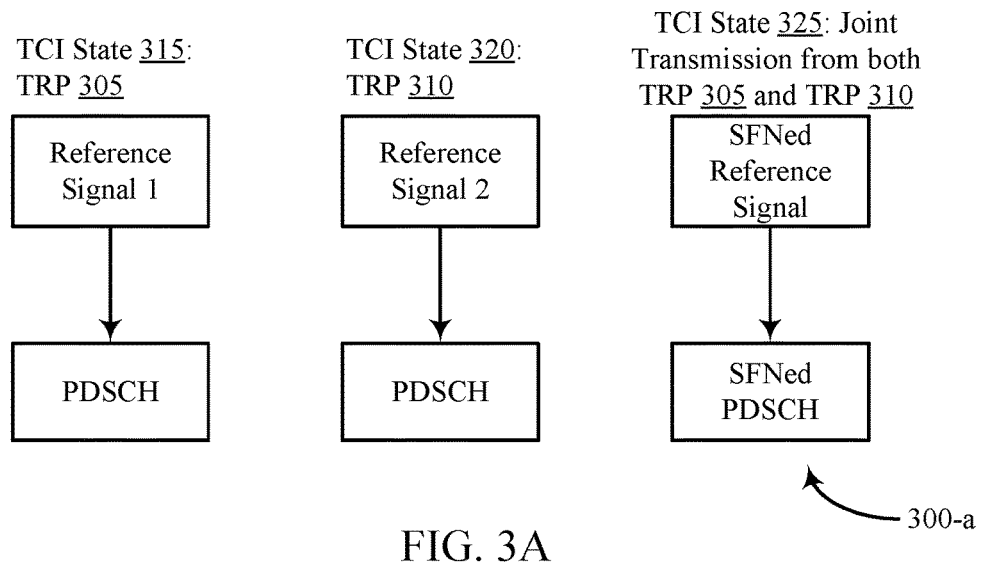
FIGS. 3A through 3C illustrates an example of a communication scheme diagram that supports dynamic DMRS configuration signaling for adaptation with different transmission modes in accordance with aspects of the present disclosure.
Figure 3B:
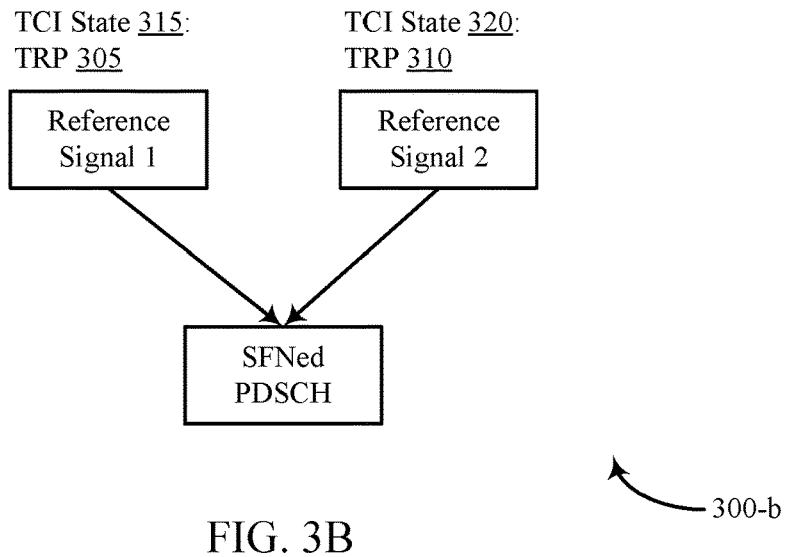
Figure 3C:
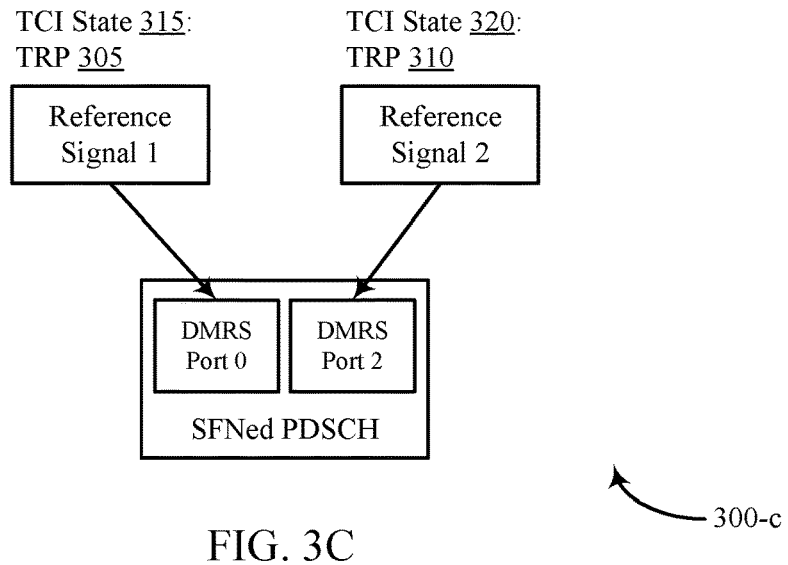

FIGS. 3A through 3C illustrates examples of communication scheme diagrams 300 that supports configuration signaling of DMRS and transmission mode in accordance with aspects of the present disclosure. In some examples, the communication scheme diagrams 300-*a*, 300-*b*, and 300-*c* may be implemented to realize aspects of the wireless communications system 100 or the wireless communications system 200. For example, TRP 305, TRP 310, or both, which may be examples of TRPs 205 as described with reference to FIG. 2 (e.g., multi-TRPs), and UEs 115 may employ one or more SFN schemes illustrated by communication scheme diagrams 300-*a*, 300-*b*, and 300-*c* as described with reference to FIGS. 1 and 2. The transmission mode configuration may relate to a transmission mode for communicating with one or more TRPs 205. In some cases, TRP 305, TRP 310, or both may transmit one or more data messages to a UE 115 using an SFN scheme of the SFN schemes. In some cases, the communication scheme diagrams 300-*a*, 300-*b*, and 300-*c* may illustrate joint downlink transmissions to the UE 115 from a TRP 305 applying a TCI state 315 and from a TRP 310 applying a TCI state 320.

The communication scheme diagram 300-*a* illustrates an SFN scheme 0. In some aspects, the SFN communication 0 may also refer to a transparent SFN scheme. In some examples, the TRP 305 and the TRP 310 may each transmit two separate reference signals (e.g., a reference signal 1 and a reference signal 2, respectively). For example, a single TRP, such as the TRP 305 or the TRP 310, may transmit a reference signal, such as Reference Signal 1 or Reference Signal 2, respectively. In some other examples, communication scheme diagram 300-*a* may illustrate a transparent SFN scheme using multiple TRPs, such as TRP 305 and TRP 310. In the transparent SFN scheme, the TRP 305 and the TRP 310 may transmit a joint transmission of an SFNed Reference Signal. Each transmission scheme scenario (e.g., a single TRP or the joint transmission from multiple TRPs) may have different TCI or QCL states and TRSs correspondingly. In some cases, for a single TRP transmission, the TRP 305 may have a TCI state 315 and the TRP 310 may have a TCI state 320. In some other cases, such as for the joint transmission, the TRP 305 and the TRP 310 may have a single TCI state 325. In some examples, a DMRS may be QCLed with the indicated one or two TCI states, each DMRS port may be QCLed with one of the indicated TCI states as in the case of SDM, TDM, FDM, or SFN scheme 2 (e.g., illustrated in FIG. 3C), or each DMRS port may be QCLed with both TCI states as in the case of SFN scheme 1 (e.g., illustrated in FIG. 3B). For SFN transmission scheme 0, the TRP may not use two TCI states, but may use a single TCI state and a single SFNed TRS or DMRS. In some examples, to achieve an "SFNed" PDSCH, the TRP 305 and the TRP 310 may define an additional TCI state, such as a TCI state 325, that may be used to transmit an "SFNed"

reference signal (such as a TRS) associated with an "SFNed" PDSCH. The "SFNed" PDSCH in the SFN communication 0 may include DMRS ports and data layers that are associated with the additional TCI state 325.

The communication scheme diagram 300-b illustrates an SFN scheme 1. In such an SFN scheme 1, the TRP 305 and the TRP 310 may transmit two separate reference signals (e.g., a reference signal 1 and a reference signal 2, respectively) and also with a joint "SFNed" PDSCH in which each DMRS port or data layer of the "SFNed" PDSCH is associated with both the TCI state 315 and the TCI state 320. In other words, the TRP 305 and the TRP 310 may transmit reference signals (such as TRSs) in a TRP-specific or non-SFN manner while the associated DMRS and PDSCH or PDCCH from the TRPs are transmitted in an SFN manner.

The communication scheme diagram 300-c illustrates an SFN scheme 2. In such an SFN scheme 2, the TRP 305 and the TRP 310 may transmit two separate reference signals (e.g., a reference signal 1 and a reference signal 2, respectively) and also with a joint PDSCH in which each data layer of the joint PDSCH is associated with the TCI state 315 and the TCI state 320 while each DMRS port of the joint PDSCH is associated with either the TCI state 315 or the TCI state 320 (e.g., not both). For example, a DMRS port 0 of the joint PDSCH may be associated with the TCI state 315 (and not with the TCI state 320) and a DMRS port 2 of the joint PDSCH may be associated with the TCI state 320 (and not with the TCI state 315). In other words, the TRP 305 and the TRP 310 may transmit reference signals (such as TRSs) and DMRS in a TRP-specific or non-SFN manner while the associated with PDSCH (e.g., data layers) from the TRPs is transmitted in an SFN manner.

In some examples, a UE 115 may receive a configuration from a TRP 205 that indicates a set of parameters common to the SDM scheme and an SFN scheme. The UE 115 may receive an indication of a communication scheme from the TRP 205 indicating one of SFN scheme 0, SFN scheme 1, or SFN scheme 2 illustrated in communication scheme diagram 300-a through communication scheme diagram 300-c, respectively. The UE 115 may determine a set of parameters for communication with TRP 305, TRP 310, or both specific to the SFN scheme. For example, the indication of the communication scheme may include one or more parameters specific to the SFN scheme and multi-TRP or single TRP transmission. The UE 115 may receive transmission from TRP 305, TRP 310, or both and may process the transmission according to the SDM, TDM, or FDM scheme. For example, the UE 115 may perform channel estimation based on the SDM scheme.

In some cases, a UE 115 and a base station 105 may communicate using one or more TRPs, such as TRP 305, TRP 310, or both, in an HST scenario. The UE 115 may identify a transmission scheme, such as SFN scheme 1, SFN scheme 2, a multi-TRP SDM scheme, or DPS with a single TCI based on the dynamically signaled transmission mode configuration. The UE 115 may use the transmission scheme to receive one or more downlink transmissions from the base station 105 via TRP 305, TRP 310, or both.

Figure 4:
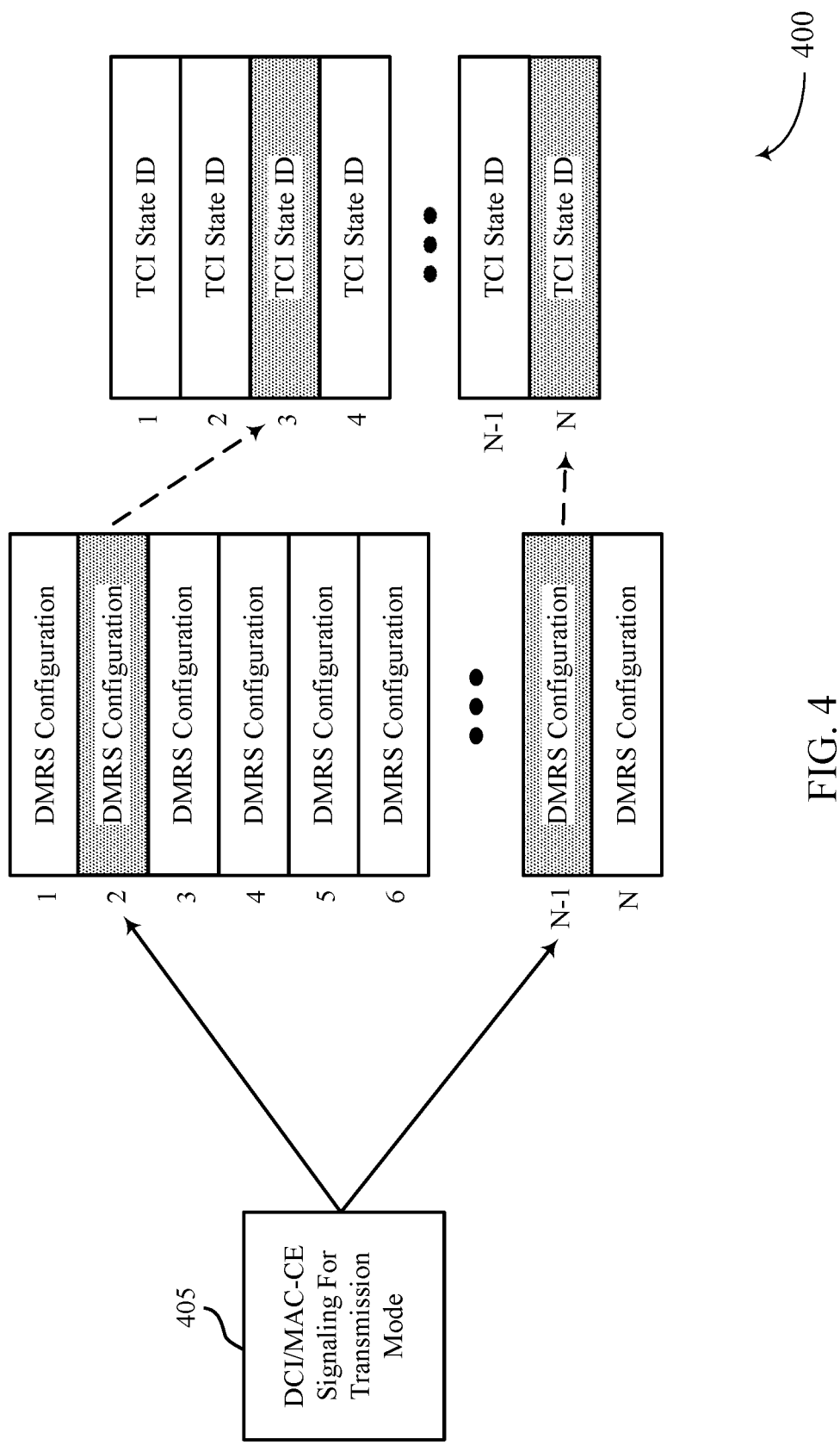
FIG. 4 illustrates an example of a configuration diagram that supports dynamic DMRS configuration signaling for adaptation with different transmission modes in accordance with aspects of the present disclosure.

FIG. 4 illustrates an example of a configuration diagram 400 that supports dynamic DMRS configuration signaling for adaptation with different transmission modes in accordance with aspects of the present disclosure. A UE 115 and one or more TRPs 205 of a base station 105 may communicate according to configuration diagram 400. UE 115 may receive control signaling from base station 105 indicating DMRS configurations and transmission mode configurations.

At 405, a UE 115 may receive, from a base station 105, DCI or MAC-CE signaling for Doppler shift pre-compensation. In some cases, DMRS activation may be performed in advance of the signaling performed at 405. The UE 115 may use a transmission mode to refer to the corresponding active DMRS configuration option based on an association with the DMRS (e.g., indicated before or pre-defined). Each of the two activated DMRS configurations may be associated with a transmission mode. For example, the DCI or MAC-CE signaling at 405 may indicate that DMRS configuration 2 is activated, and that DMRS configuration N−1 is activated. The two DMRS configurations may also be mapped to one of the TRPs 205 of base station 105, as described herein. The DCI or MAC-CE signaling at 405 may include an additional indication bit or flag that may indicate which one of the two DMRS configurations that are in use, the MAC-CE may be referring. The DMRS configuration (e.g., DMRS configuration 2 or N−1) activated by MAC-CE having indicator bit equal to 0 or 1 may be used for a corresponding predefined list of HST-SFN transmission modes, or for a pre-defined TRP (based on the indicator bit and a list of predefined or pre-configured associations). In some cases, the indicator bit may be a pointer to a first active DMRS or a second active DMRS configuration in terms of a logical index. Association with a specific TRP may be done by referring to a lowest active TCI state ID (e.g., if the indicator in the activating MAC-CE is 0) or to a higher active TCI state ID (e.g., if the indicator in the activating MAC-CE is 1). In cases where more than two active DMRS configurations are indicated, there may be more bits in the indicator flag field of MAC-CE. In cases where two or more active DMRS configurations are used per allocation (e.g., one per each TRP or active TCI state for scenarios where DMRS is transmitted in a non SFN manner), each active DMRS configuration may be associated with a pre-defined CDM group (e.g., a list of DMRS ports). For example, CDM group 0 (e.g., DMRS ports 0 and 1) may be associated with a lowest active TCI state ID, CDM group 1 (e.g., DMRS ports 2 and 3) may be associated with a second highest activated TCI state ID. This way, each one of the two activated DMRS configuration options may have an association with a specific TRP and also with a specific CDM group on which will be transmitted DMRS ports of this TRP (this way the UE may know which one of the activated DMRS configurations to assume and on which ports).

In some cases, there may be a mapping between an activated DMRS configuration index (e.g., an option out of N) and an associated active TCI state ID (e.g., related to a specific TRP). TCI state ID may change dynamically as TRPs are changed along the train track for an HST scenario, so each active DMRS "container" or DMRS option in use may be refer dynamically to a different TRP based on a relatively lower or higher TCI state ID rule. Each active DMRS conf "container" or DMRS option in use may be "reconfigured" by means of activation of a different DMRS configuration option with a MAC-CE that may have an indicator bit pointing on the specific container (or 0 for the first container or 1 for the second container).

In the example of configuration diagram 400, DMRs configuration 2 may be associated with TCI state ID 3, and DMRS configuration N−1 may be associated with TCI state ID N. In other scenario, the usage of the two activated DMRS options may follow the dynamically indicated HST-SFN transmission mode options, based on a predefined association. In a first example, each of the activated DMRS options (e.g., 2 and N−1) may be used for the corresponding HST-SFN transmission mode (e.g., a scheme 1 transmission mode with Doppler shift pre-compensation or another transmission mode association for a second activated DMRS option) that may be dynamically signaled by MAC-CE or by the scheduling DCI at 405. In this example, there may be no same index association between DMRS configurations and option to be addressed in the dynamic selection/activation process may be described by means of the following list of DMRS parameters (aligned with DMRS parameters typically provided by RRC configuration in case of a single semi-statically configured DMRS option):

|  | DMRS parameter | DMRS parameter | DMRS parameter | DMRS parameter |
|---|---|---|---|---|
| DMRS parameter name (existing RRC parameter) | DMRS type (e.g., dmrs-Type) | DMRS Additional Position (e.g., dmrs-AdditionalPosition) | Maximum length (e.g., maxLength) | DMRS Type A first Position (e.g., dmrs-TypeA-Position) |
| Parameter meaning | DMRS type A or B | Number of DMRS locations per allocation (e.g., 1,2,3,4) | Max number of DMRS symbols per location (1 or 2) | First DMRS symbol location index for DMRS type A (index = 2 or 3), for DMRS type B it is index = 0 by definition |

TCI states (e.g., no association between DMRS configuration 2 and TCI state 2). The association may be between the first activate DMRS configuration that is activated by MAC-CE having indicator bit equal to 0 (first DMRS configuration "in use") and between a first set of a one or more corresponding transmission modes and correspondingly between the second activate DMRS configuration that is activated by MAC-CE having indicator bit equal to 1 (second DMRS configuration "in use") and a second set of a one or more corresponding transmission modes. In this example, each one of the activated DMRS configurations (DMRS configurations "in use") may be shared between the associated with each one of them set of transmission mode options. An association between a set of transmission mode options and the first or the second DMRS configuration "in use" (indicated by the indication bit in the activating MAC-CE) may be configured by the BS or predefined for both BS and UE sides. In a second example, each of the activated DMRS options (DMRS configurations "in use") may be used for the corresponding TRP or TCI state (e.g., a lower/higher TCI state ID associated with DMRS configuration "in use" activated by MAC-CE having indicator bit 0/1 correspondingly), which may also be associated with a corresponding CDM group (e.g., a lower TCI state ID associated with a lower CDM group index and a higher TCI state ID associated with a higher CDM group index). In the case that more than two TRPs may be involved, more than two activated DMRS options may be used accordingly.

The activated DMRS configuration option may be used by the network and the UE 115 in downlink communications, until a re-selection or re-activation of another DMRS configuration option occurs (e.g., DMRS configuration 3 becomes to be the first DMRS option "in use" instead of DMRS configuration 1 or 2 if it is signaled by MAC-CE having indicator bit equal to 0). In some examples, a DMRS configuration 1 or DMRS configuration 2 may be activated, and a time later re-activation may take place and DMRS configuration 3 may become the active DMRS option. A default DMRS configuration may be relevant before the first activation. This default DMRS may be based on a provided RRC configuration of DMRS (e.g., no DMRS adaptation).

In some cases, there may be a default or pre-defined DMRS configuration option (e.g., the RRC configuration DMRS configuration that may be used before UE 115 is in a connected mode, and before the first activation of any DMRS configuration option. Each DMRS configuration Two DMRS options may be activated (e.g., one with indicator bit 1 and the second with indicator bit 0), each one of them (based on the indicator bit and a predefined or configured other way association) may be associated with a list of transmission mode options. When a specific transmission mode option is singled in control signaling (e.g., DCI or MAC-CE), one of the activated DMRS configurations (associated with the set of Tx mode options that includes this Tx mode) is used/assumed to receive allocations transmitted with this Tx mode. In these cases, the DMRS configurations may be activated with an indicator bit (part of the activating MAC-CE) indicating with which one or more transmission modes the DMRS configuration is associated (e.g., similar to the indication of whether the DMRS options are associated with a transmission mode). Each of the active DMRS configurations may be dynamically reactivated in order to follow DMRS adaption processes for the associated transmission mode (or transmission modes set).

In a another use case, DCI or MAC-CE signaling may indicate a first DMRS configuration associated with a first TRP and CDM group, and a second DMRS configuration associated with a second TRP and CDM group. Each of the active DMRS configuration may be dynamically reactivated in order to follow DMRS adaption processes for the associated TRP or in case of TRP change (TCI state ID change).

In a another use case, MAC-CE/DCI signaling at 405 may indicate an HST SFN scheme, a multi-TRP scheme, or DPS. The first activated DMRS configuration may be associated/used with transmission modes associated with a non SFN channel type (e.g., a multi-TRP SDM, scheme 2, and DPS TRP1 or TRP2) per DMRS port or a single TRP channel type or a single TRP channel type equivalent(as can be in case of scheme 1 with Doppler shift pre-compensation), and the second activated DMRS configuration may be associated with a SFN channel type per DMRS port (e.g., scheme 1 without Doppler shift pre-compensation or scheme 0). In some cases, the indicator bit in MAC-CE may be a pointer to a first active DMRS or a second active DMRS configuration in terms of a logical index. Association with a specific TRP may be done by referring to a lowest active TCI state ID (e.g., if the indicator in the activating MAC-CE is 0) or to a higher active TCI state ID (e.g., if the indicator in the activating MAC-CE is 1). Each of the active DMRS configurations may be dynamically reactivated in order to follow DMRS adaption processes for the associated one or more transmission modes.

Figure 5:
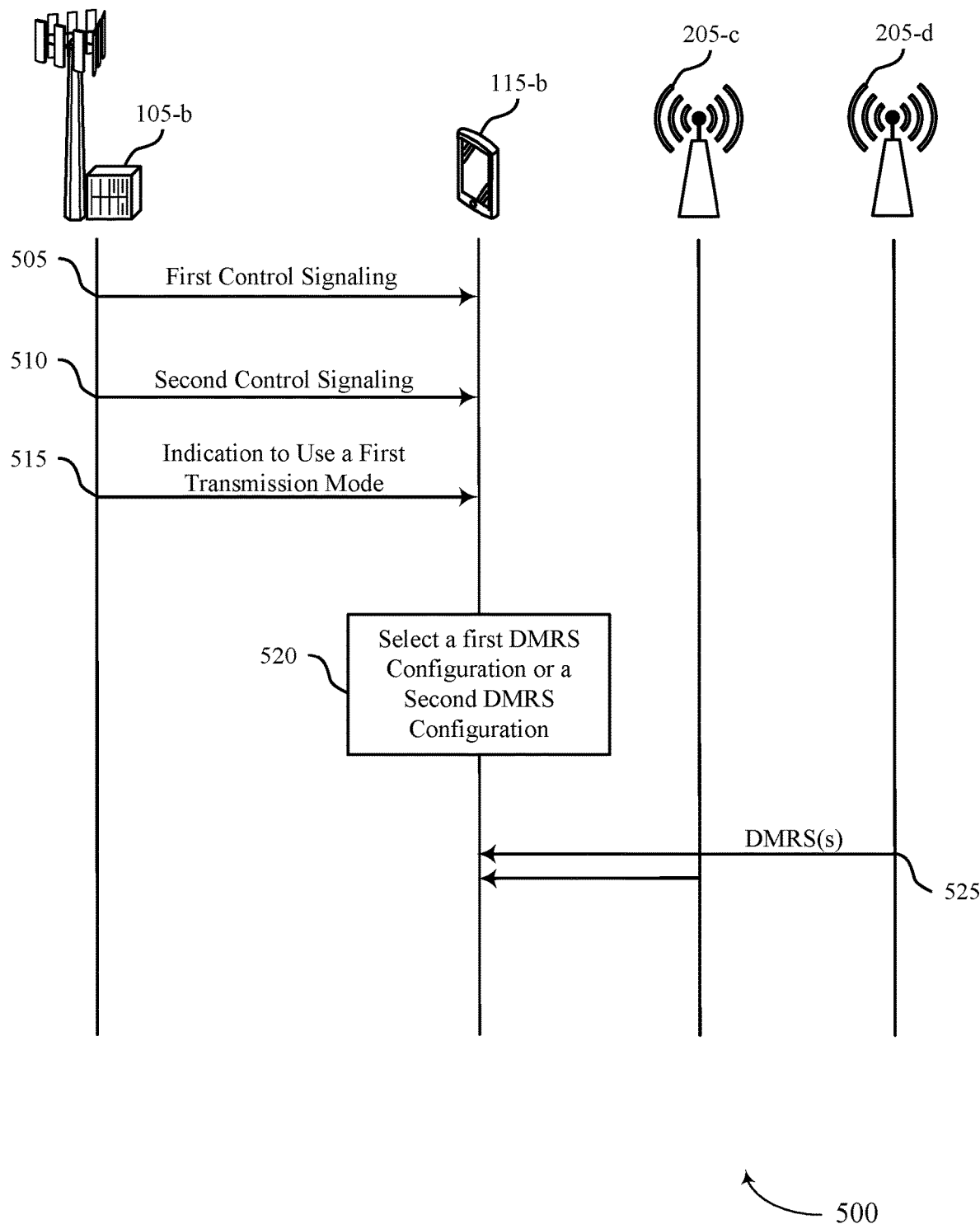
FIG. 5 illustrates an example of a process flow that supports dynamic DMRS configuration signaling for adaptation with different transmission modes in accordance with aspects of the present disclosure.

FIG. 5 illustrates an example of a process flow 500 that supports dynamic DMRS configuration signaling for adaptation with different transmission modes in accordance with aspects of the present disclosure. Process flow 500 may implement aspects of wireless communications systems 10 and 200. Process flow 500 may include UE 115-*b*, which may be an example of a UE 115 as described herein. Process flow 500 may also include base station 105-*b*, which may be an example of a base station 105 as described herein. Process flow 500 may also include TRPs 205-*a* and 205-*d*, which may be examples of TRPs as described herein. Base station 105-*b* may communicate with UE 115-*b* via first TRP 205-*c* and second TRP 205-*d* of base station 105-*b* according to a first transmission mode for multiple TRPs 205.

At 505, UE 115-*b* may receive first control signaling identifying a set of DMRS configurations (e.g., RRC configuration of a set of DMRS options). In some cases, a default or a single RRC configured DMRS configuration may be valid for any transmission mode until UE 115-*b* may receive the second control signaling activating the first or the second or both DMRS configurations (e.g., a MAC-CE activating one or more DMRS options).

At 510, UE 115-*b* may receive second control signaling activating a first DMRS configuration and a second DMRS configuration of the set of DMRS configurations received at 505. In some cases, UE 115-*b* may receive an indicator that identifies a DMRS configuration that is being activated as the first or the second DMRS configuration "in use". In some cases, the first and second DMRS configuration may be valid for the first and the second set correspondingly of one or more transmission modes.

At 515, UE 115-*b* may receive an indication for UE 115-*b* to use a first transmission mode of a set of transmission modes to communicate with multiple TRPs, including first TRP 205-*c* and second TRP 205-*d*.

In some cases, UE 115-*b* may transmit an indication of a capability of UE 115-*b* to use concurrently different DMRS configurations for different TRPs 205 in case of a non SFN transmission of DMRS ports, and to receive different DMRSs concurrently (on different CDM groups) when multi-TRP 205 transmission is used. UE 115-*b* may receive at least in part in response to the transmitted indication of the capability, control signaling indicating for UE 115-*b* to use concurrently the first DMRS configuration for the first TRP 205-*c* and the second DMRS configuration for the second TRP 205-*d*.

In some cases, UE 115-*b* may receive MAC-CE signaling or a DCI message that may include the indication for UE 115-*b* to use a first transmission mode of the set of transmission modes.

At 520, UE 115-*b* may select at least one of the first activated DMRS configuration or the second activated DMRS configuration based on the indicated first transmission mode and a set of associations between the set of transmission modes and the set of DMRS configurations and based on an indicator included in an activating MAC-CE. The set of associations may indicate that the at least one of the first activated DMRS configuration or the second activated DMRS configuration may be associated with the first transmission mode.

In some cases, UE 115-*b* may identify a set of associations between the first and the second activated DMRS configurations of the set of DMRS configurations, and a first and a second set of one or more transmission mode options (e.g., signaled or predefined associations). UE 115-*b* may identify which DMRS configuration to be assumed at UE 115-*b* in response to the received indicator (part of the activating MAC-CE) and according to the set of associations defining that the first activated DMRS configuration is associated with a transmission mode option of the first set of transmission mode options, and that the second activated DMRS configuration may be associated with a transmission mode option of the second set of transmission mode options.

In some cases, UE 115-*b* may identify a set of associations between the first and the second activated DMRS configurations of the set of DMRS configurations and the multiple TRPs 205. UE 115-*b* may identify which activated DMRS configuration is to be assumed per TRP 205 in response to a received indication to switch to a second transmission mode, and based on the received indicator (part of the activating MAC-CE), and according to the set of associations defining that the first activated DMRS configuration is associated with the first TRP 205-*c* for the second transmission mode, and that the second activated DMRS configuration is associated with the second TRP 205-*d* for the second transmission mode.

In some cases, UE 115-*b* may identify which DMRS configuration is to be assumed per TRP 205 in response to a received indication to switch to a second transmission mode. This identifying may be based on the received indicator (part of the activating MAC-CE), and according to the set of associations defining that the first activated DMRS configuration may be associated with a first TCI state ID (e.g., a lower ID) that may correspond to the first TRP 205-*c*, and defining that the second DMRS configuration may be associated with a second TCI state ID (e.g., a higher ID) that may correspond to the second TRP 205-*d*. UE 115-*b* may also identify that the first DMRS configuration and the first TRP may be associated with a first CDM group (a lower index CDM group) of the set of CDM groups based on the first CDM group being associated with the first (lower) TCI state ID. UE 115-*b* may also identify that the second DMRS configuration and the second TRP is associated with a second CDM group (a higher index CDM group) of the set of CDM groups based on the second CDM group being associated with the second (higher) TCI state ID.

The first transmission mode may include a first single frequency network transmission scheme with pre-compensation, a second single frequency network transmission scheme with pre-compensation (and optionally association with DMRS of the first TRP), the second single frequency network transmission scheme without pre-compensation (and optionally association with DMRS of the first TRP), a dynamic point selection mode (and optionally association with DMRS of the first TRP), or a SDM scheme (and optionally association with DMRS of the first TRP). The second transmission mode may include the first single frequency network transmission scheme without pre-compensation, a transparent single frequency network transmission scheme, the second single frequency network transmission scheme with pre-compensation (and optionally association with DMRS of the second TRP), the second single frequency network transmission scheme without pre-compensation (and optionally association with DMRS of the second TRP), the dynamic point selection mode (and optionally association with DMRS of the second TRP), or the SDM scheme (and optionally association with DMRS of the second TRP). In some cases, there may be DMRS configuration sharing between different transmission modes (e.g., for some of them each DMRS is per TRP). For example, different types of channel per DMRS ports may share a same configuration:

| HST SFN transmission scheme | Channel type per DMRS port | Number of "active" DMRS configurations per allocation | DMRS configuration option reuse with dynamic Tx mode switching |
|---|---|---|---|
| SFN scheme 1 with pre-compensation | Single TRP channel | 1 | Shared configuration 1 or configuration 2 |
| SFN scheme 1 without pre-compensation | Multi-TRP/ SFN channel | 1 | Shared configuration 3 |
| SFN scheme 2 with or without pre-compensation | Single TRP channel | 2 | Shared configuration 1 and configuration 2 |
| DPS (single TCI) | Single TRP channel | 1 | Shared configuration 1 or configuration 2 |
| Multi-TRP (SDM) | Single TRP channel | 2 | Shared configuration 1 and configuration 2 |
| Transparent SFN | Multi-TRP/ SFN channel | 1 | Shared configuration 3 |

At 525, UE 115-*b* may receive DMRSs from the first TRP 205-*c* and the second TRP 205-*d* according to the selected at least one of the first activated DMRS configuration or the second activated DMRS configuration.

In some cases, UE 115-*b* may also receive, via first TRP 205-*c* and second TRP 205-*d*, downlink data (e.g., on PDSCH) based on the received DMRS signals from first TRP 205-*c* and second TRP 205-*d*. The DMRSs from the first TRP 205-*c* may be transmitted on a same set of resources as the DMRSs from the second TRP 205-*d* (SFN type of channel per DMRS port, same DMRS configuration is assumed for both TRPs in this case). Or, the DMRSs from the first TRP 205-*c* may be transmitted on a different set of resources as the DMRSs from the second TRP 205-*d* (non SFN type of channel per DMRS port, different DMRS configurations may be used per TRP in this case).

In some cases, UE 115-*b* may receive, from base station 105-*b*, a control message including an indication that UE 115-*b* is to reactivate the first or the second or both DMRS configurations with the corresponding indicator having a first value that is associated with the first DMRS configuration "in use" and correspondingly with the first set of transmission modes or the first TRP 205-*c*, where a second value of the indicator is associated with the second DMRS configuration "in use" and correspondingly with the second set of transmission modes or the second TRP 205-*d*.

Figure 6:
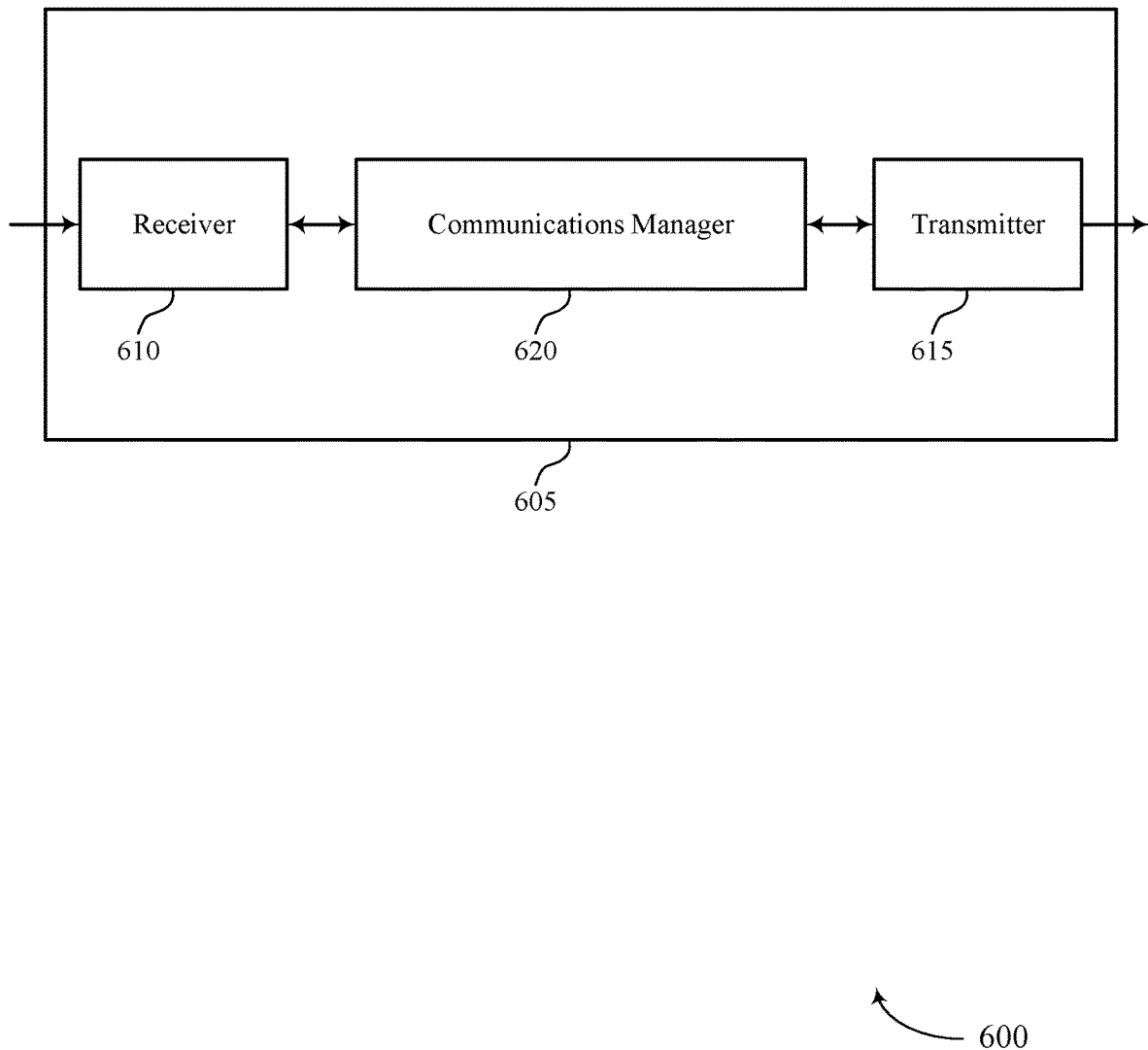
FIGS. 6 and 7 show block diagrams of devices that support dynamic DMRS configuration signaling for adaptation with different transmission modes in accordance with aspects of the present disclosure.

FIG. 6 shows a block diagram 600 of a device 605 that supports dynamic DMRS configuration signaling for adaptation with different transmission modes in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic DMRS configuration signaling for adaptation with different transmission modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic DMRS configuration signaling for adaptation with different transmission modes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of dynamic DMRS configuration signaling for adaptation with different transmission modes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control signaling identifying a set of DMRS configurations. The communications manager 620 may be configured as or otherwise support a means for receiving control signaling activating a first DMRS configuration and a second DMRS configuration of the set of DMRS configurations. The communications manager 620 may be configured as or otherwise support a means for receiving an indication for the UE to use a first transmission mode of a set of transmission modes to communicate with multiple TRPs, including a first TRP and a second TRP. The communications manager 620 may be configured as or otherwise support a means for selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The communications manager 620 may be configured as or otherwise support a means for receiving DMRSs from the first TRP and the second TRP according to the selected at least one of the first DMRS configuration or the second DMRS configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and reduced power consumption.

Figure 7:
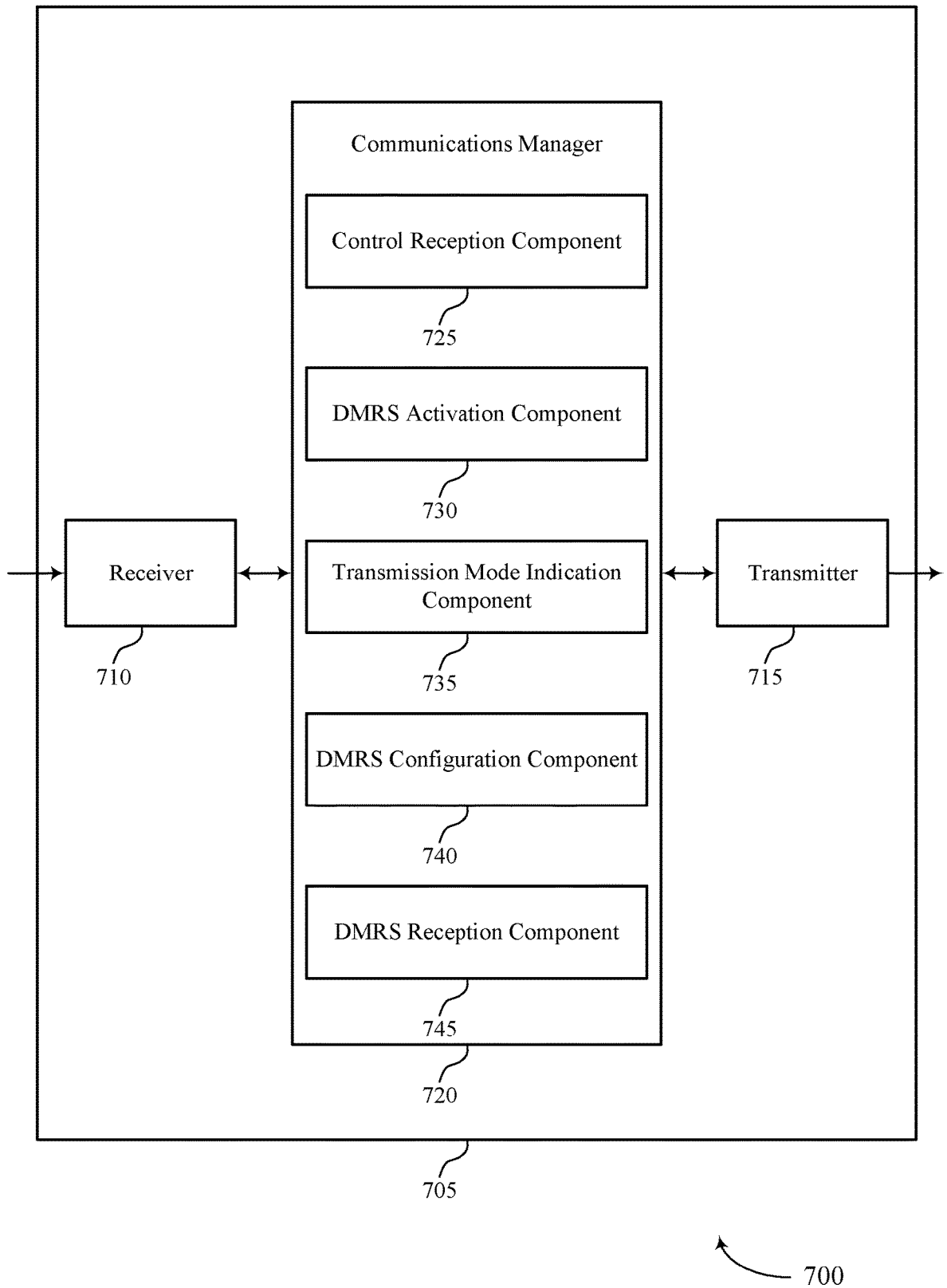

FIG. 7 shows a block diagram 700 of a device 705 that supports dynamic DMRS configuration signaling for adaptation with different transmission modes in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic DMRS configuration signaling for adaptation with different transmission modes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic DMRS configuration signaling for adaptation with different transmission modes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of dynamic DMRS configuration signaling for adaptation with different transmission modes as described herein. For example, the communications manager 720 may include a control reception component 725, a DMRS activation component 730, a transmission mode indication component 735, a DMRS configuration component 740, a DMRS reception component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control reception component 725 may be configured as or otherwise support a means for receiving control signaling identifying a set of DMRS configurations. The DMRS activation component 730 may be configured as or otherwise support a means for receiving control signaling activating a first DMRS configuration and a second DMRS configuration of the set of DMRS configurations. The transmission mode indication component 735 may be configured as or otherwise support a means for receiving an indication for the UE to use a first transmission mode of a set of transmission modes to communicate with multiple TRPs, including a first TRP and a second TRP. The DMRS configuration component 740 may be configured as or otherwise support a means for selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The DMRS reception component 745 may be configured as or otherwise support a means for receiving DMRSs from the first TRP and the second TRP according to the selected at least one of the first DMRS configuration or the second DMRS configuration.

Figure 8:
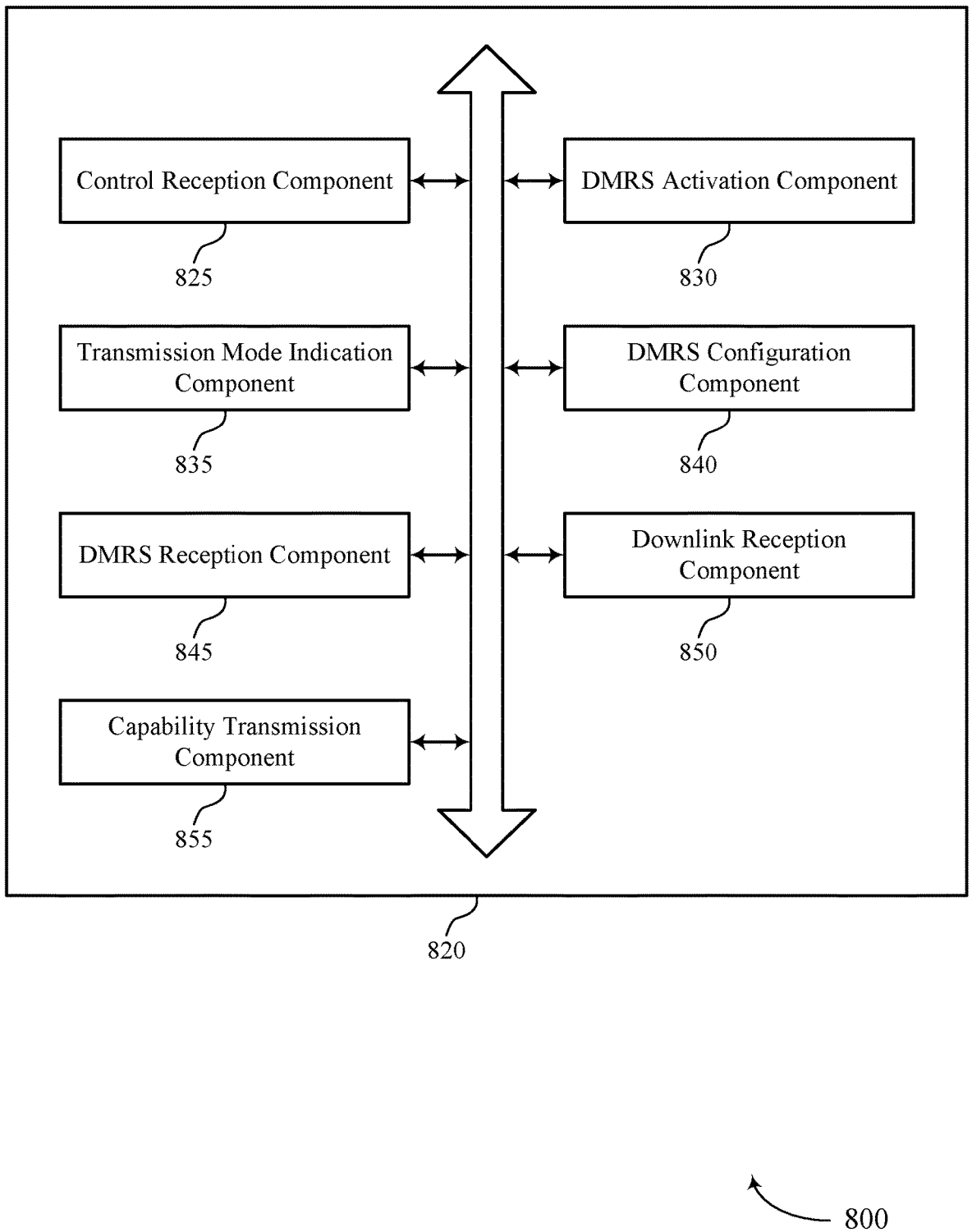
FIG. 8 shows a block diagram of a communications manager that supports dynamic DMRS configuration signaling for adaptation with different transmission modes in accordance with aspects of the present disclosure.

FIG. 8 shows a block diagram 800 of a communications manager 820 that supports dynamic DMRS configuration signaling for adaptation with different transmission modes in accordance with aspects of the present disclosure. The communications manager 820 may be an example of aspects of a communications manager 620, a communications manager 720, or both, as described herein. The communications manager 820, or various components thereof, may be an example of means for performing various aspects of dynamic DMRS configuration signaling for adaptation with different transmission modes as described herein. For example, the communications manager 820 may include a control reception component 825, a DMRS activation component 830, a transmission mode indication component 835, a DMRS configuration component 840, a DMRS reception component 845, a downlink reception component 850, a capability transmission component 855, or any combination thereof. Each of these components may communicate, directly or indirectly, with one another (e.g., via one or more buses).

The communications manager 820 may support wireless communication at a UE in accordance with examples as disclosed herein. The control reception component 825 may be configured as or otherwise support a means for receiving control signaling identifying a set of DMRS configurations. The DMRS activation component 830 may be configured as or otherwise support a means for receiving control signaling activating a first DMRS configuration and a second DMRS configuration of the set of DMRS configurations. The transmission mode indication component 835 may be configured as or otherwise support a means for receiving an indication for the UE to use a first transmission mode of a set of transmission modes to communicate with multiple TRPs, including a first TRP and a second TRP. The DMRS configuration component 840 may be configured as or otherwise support a means for selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The DMRS reception component 845 may be configured as or otherwise support a means for receiving DMRSs from the first TRP and the second TRP according to the selected at least one of the first DMRS configuration or the second DMRS configuration.

In some examples, the downlink reception component 850 may be configured as or otherwise support a means for receiving, via the first TRP and the second TRP, downlink data based on the received DMRSs from the first TRP and the second TRP, where the DMRSs from the first TRP are transmitted on a same set of resources as the DMRSs from the second TRP.

In some examples, the downlink reception component 850 may be configured as or otherwise support a means for receiving, via the first TRP and the second TRP, downlink data based on the received DMRSs, where the DMRSs from the first TRP are transmitted on a different set of resources as the DMRSs from the second TRP.

In some examples, the capability transmission component 855 may be configured as or otherwise support a means for transmitting an indication of a capability of the UE to use concurrently different DMRS configurations for different TRPs and to receive different DMRS signals concurrently when multi TRP transmission is used. In some examples, the control reception component 825 may be configured as or otherwise support a means for receiving, at least in part in response to the transmitted indication of the capability, control signaling indicating for the UE to use concurrently the first DMRS configuration for the first TRP and the second DMRS configuration for the second TRP.

In some examples, the DMRS activation component 830 may be configured as or otherwise support a means for receiving an indicator that identifies a DMRS configuration that is being activated as the first or the second DMRS configuration.

In some examples, the DMRS configuration component 840 may be configured as or otherwise support a means for identifying a set of associations between the first and the second activated DMRS configurations of the set of DMRS configurations and a first and a second set of one or more transmission mode options. In some examples, the DMRS configuration component 840 may be configured as or otherwise support a means for identifying which DMRS configuration to be assumed at the UE in response to the received indicator and according to the set of associations defining that the first DMRS configuration is associated with a transmission mode option of the first set of transmission mode options, and that the second DMRS configuration is associated with a transmission mode option of the second set of transmission mode options.

In some examples, the DMRS activation component 830 may be configured as or otherwise support a means for identifying a set of associations between the first and the second activated DMRS configurations of the set of DMRS configurations and the multiple TRPs. In some examples, the DMRS configuration component 840 may be configured as or otherwise support a means for identifying, which DMRS configuration to be assumed per TRP in response to a received indication to switch to a second transmission mode, the received indicator, and according to the set of associations defining that the first DMRS configuration is associated with the first TRP for the second transmission mode, and that the second DMRS configuration is associated with the second TRP for the second transmission mode.

In some examples, the DMRS configuration component 840 may be configured as or otherwise support a means for identifying, which DMRS configuration to be assumed per TRP in response to a received indication to switch to a second transmission mode, the received indicator, and according to the set of associations defining that the first DMRS configuration is associated with a first transmission configuration indicator state that corresponds to the first TRP, and defining that the second DMRS configuration is associated with a second transmission configuration indicator state that corresponds to the second TRP. In some examples, the DMRS configuration component 840 may be configured as or otherwise support a means for identifying that the first DMRS configuration is associated with a first code division multiplexing group of the set of code division multiplexing groups based on the first code division multiplexing group being associated with the first transmission configuration indicator state. In some examples, the DMRS configuration component 840 may be configured as or otherwise support a means for identifying that the second DMRS configuration is associated with a second code division multiplexing group of the set of code division multiplexing groups based on the second code division multiplexing group being associated with the second transmission configuration indicator state.

In some examples, the first and the second DMRS configuration is valid for the first and the second set correspondingly of one or more transmission modes until a subsequent activating control signaling and the corresponding indicator that activates a different DMRS configuration for the first or the second DMRS configuration or for both of them is received by the UE.

In some examples, a default or a single RRC configured DMRS configuration is valid for any transmission mode until receiving the first control signaling activating the first or the second or both DMRS configurations.

In some examples, to support receiving the indication for the UE to use a first transmission mode of the set of transmission modes, the transmission mode indication component 835 may be configured as or otherwise support a means for receiving MAC-CE signaling or a DCI message that includes the indication for the UE to use a first transmission mode of the set of transmission modes.

In some examples, the DMRS activation component 830 may be configured as or otherwise support a means for receiving, from a base station, a control message including an indication that the UE is to reactivate the first or the second or both DMRS configurations with the corresponding indicator having a first value that is associated with the first set of transmission modes or the first TRP, where a second value of the indicator is associated with the second set of transmission modes or the second TRP.

Figure 9:
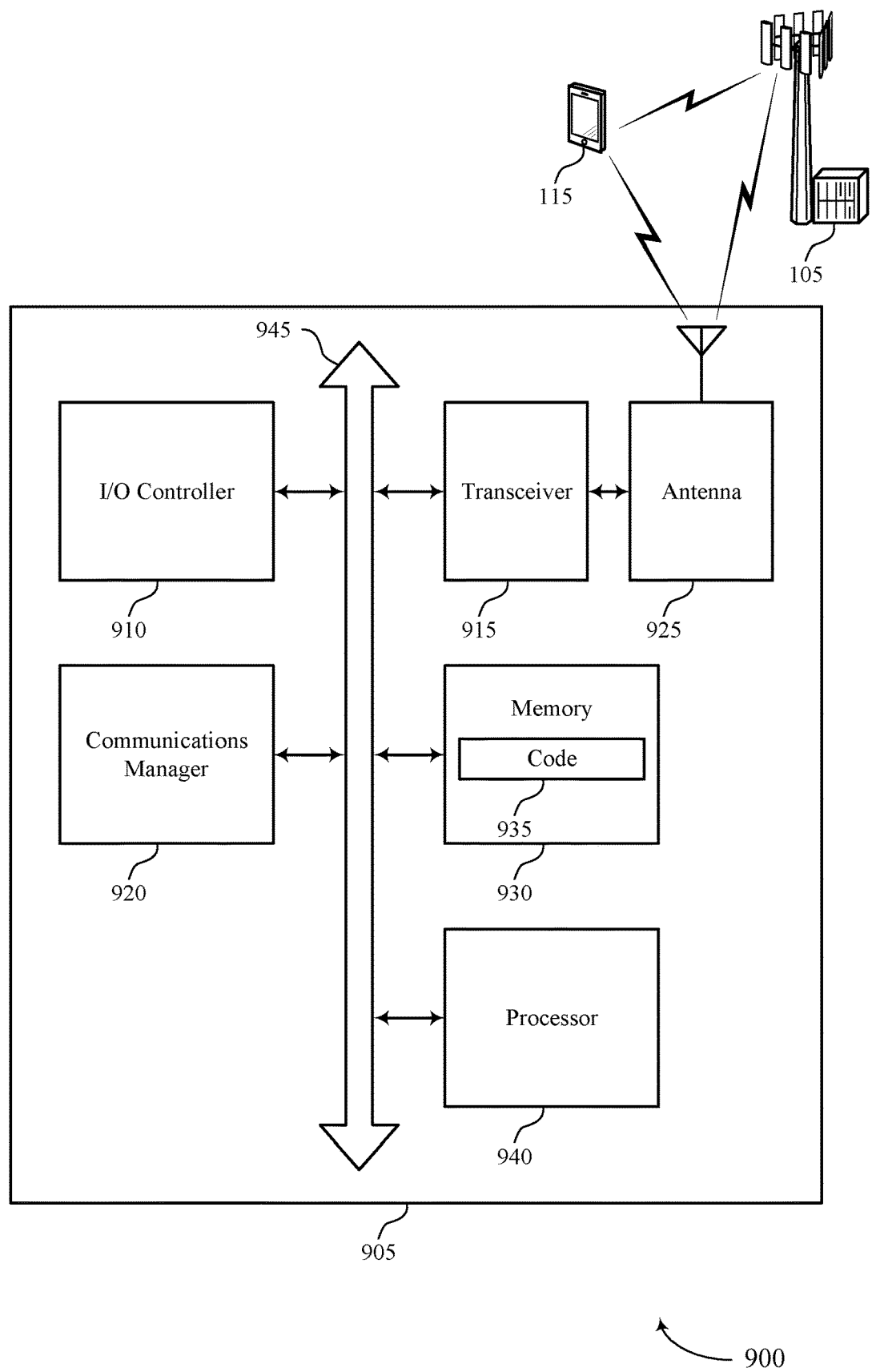
FIG. 9 shows a diagram of a system including a device that supports dynamic DMRS configuration signaling for adaptation with different transmission modes in accordance with aspects of the present disclosure.

FIG. 9 shows a diagram of a system 900 including a device 905 that supports dynamic DMRS configuration signaling for adaptation with different transmission modes in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic DMRS configuration signaling for adaptation with different transmission modes). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling identifying a set of DMRS configurations. The communications manager 920 may be configured as or otherwise support a means for receiving control signaling activating a first DMRS configuration and a second DMRS configuration of the set of DMRS configurations. The communications manager 920 may be configured as or otherwise support a means for receiving an indication for the UE to use a first transmission mode of a set of transmission modes to communicate with multiple TRPs, including a first TRP and a second TRP. The communications manager 920 may be configured as or otherwise support a means for selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The communications manager 920 may be configured as or otherwise support a means for receiving DMRSs from the first TRP and the second TRP according to the selected at least one of the first DMRS configuration or the second DMRS configuration.

By including or configuring the communications manager 920 in accordance with examples as described herein, the device 905 may support techniques for improved communication reliability and reduced latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic DMRS configuration signaling for adaptation with different transmission modes as described herein, or the processor 940 and the memory 930 may be otherwise configured to perform or support such operations.

Figure 10:
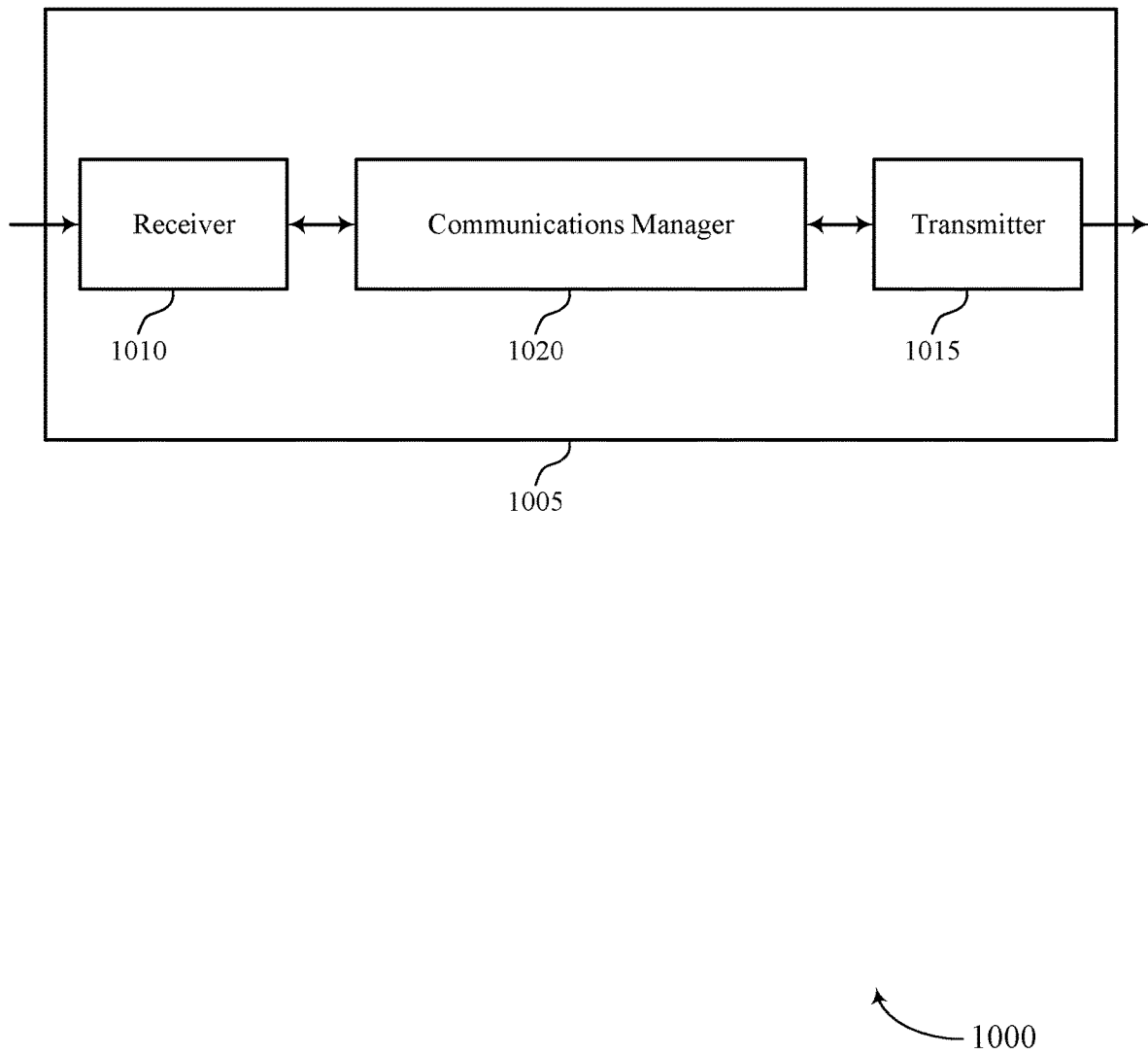
FIGS. 10 and 11 show block diagrams of devices that support dynamic DMRS configuration signaling for adaptation with different transmission modes in accordance with aspects of the present disclosure.

FIG. 10 shows a block diagram 1000 of a device 1005 that supports dynamic DMRS configuration signaling for adaptation with different transmission modes in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic DMRS configuration signaling for adaptation with different transmission modes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic DMRS configuration signaling for adaptation with different transmission modes). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of dynamic DMRS configuration signaling for adaptation with different transmission modes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for communicating with a UE via a first TRP and a second TRP of the base station according to a first transmission mode for multiple TRPs. The communications manager 1020 may be configured as or otherwise support a means for transmitting DMRSs via the first TRP and the second TRP according to a first DMRS configuration of a set of DMRS configurations. The communications manager 1020 may be configured as or otherwise support a means for transmitting, to the UE, an indication to switch to a second transmission mode for multiple TRPs. The communications manager 1020 may be configured as or otherwise support a means for transmitting DMRSs via the first TRP and the second TRP according to a second DMRS configuration of the set of DMRS configurations based on the second transmission mode.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and reduced power consumption.

Figure 11:
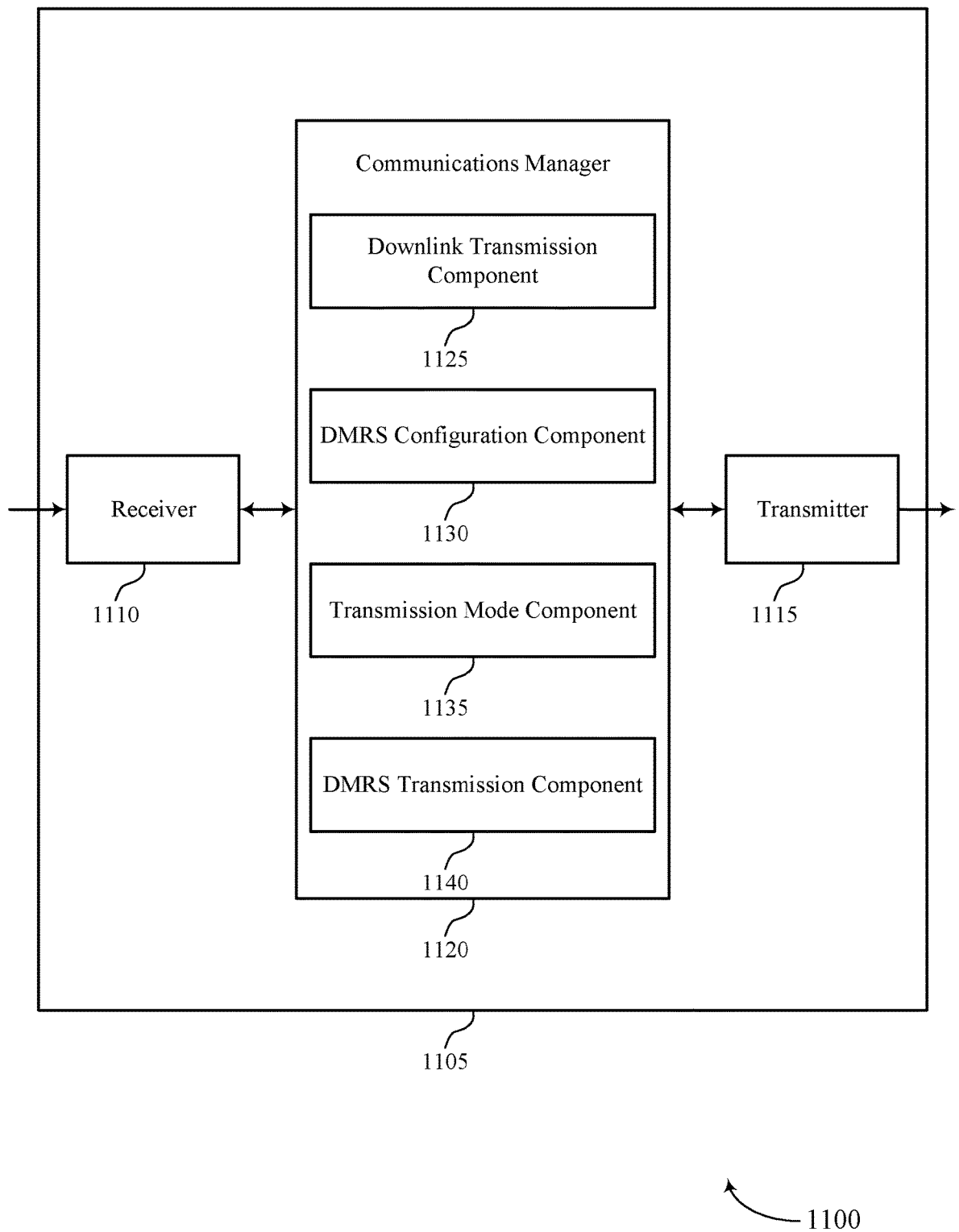

FIG. 11 shows a block diagram 1100 of a device 1105 that supports dynamic DMRS configuration signaling for adaptation with different transmission modes in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic DMRS configuration signaling for adaptation with different transmission modes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic DMRS configuration signaling for adaptation with different transmission modes). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of dynamic DMRS configuration signaling for adaptation with different transmission modes as described herein. For example, the communications manager 1120 may include a downlink transmission component 1125, a DMRS configuration component 1130, a transmission mode component 1135, a DMRS transmission component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The downlink transmission component 1125 may be configured as or otherwise support a means for communicating with a UE via a first TRP and a second TRP of the base station according to a first transmission mode for multiple TRPs. The DMRS configuration component 1130 may be configured as or otherwise support a means for transmitting DMRSs via the first TRP and the second TRP according to a first DMRS configuration of a set of DMRS configurations. The transmission mode component 1135 may be configured as or otherwise support a means for transmitting, to the UE, an indication to switch to a second transmission mode for multiple TRPs. The DMRS transmission component 1140 may be configured as or otherwise support a means for transmitting DMRSs via the first TRP and the second TRP according to a second DMRS configuration of the set of DMRS configurations based on the second transmission mode.

Figure 12:
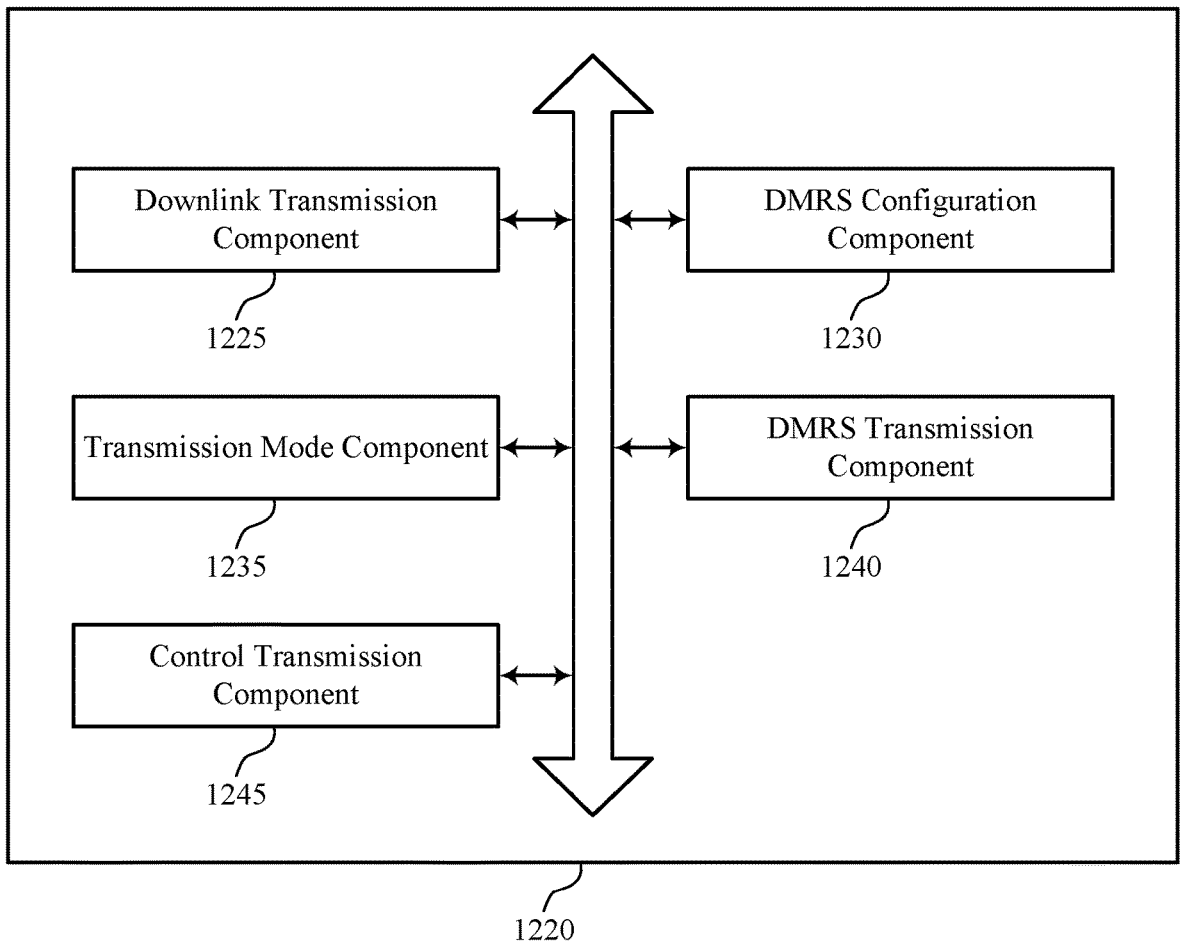
FIG. 12 shows a block diagram of a communications manager that supports dynamic DMRS configuration signaling for adaptation with different transmission modes in accordance with aspects of the present disclosure.

FIG. 12 shows a block diagram 1200 of a communications manager 1220 that supports dynamic DMRS configuration signaling for adaptation with different transmission modes in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of dynamic DMRS configuration signaling for adaptation with different transmission modes as described herein. For example, the communications manager 1220 may include a downlink transmission component 1225, a DMRS configuration component 1230, a transmission mode component 1235, a DMRS transmission component 1240, a control transmission component 1245, or any combination thereof. Each of these components may communicate, directly or indirectly, with one another (e.g., via one or more buses).

The communications manager 1220 may support wireless communication at a base station in accordance with examples as disclosed herein. The downlink transmission component 1225 may be configured as or otherwise support a means for communicating with a UE via a first TRP and a second TRP of the base station according to a first transmission mode for multiple TRPs. The DMRS configuration component 1230 may be configured as or otherwise support a means for transmitting DMRSs via the first TRP and the second TRP according to a first DMRS configuration of a set of DMRS configurations. The transmission mode component 1235 may be configured as or otherwise support a means for transmitting, to the UE, an indication to switch to a second transmission mode for multiple TRPs. The DMRS transmission component 1240 may be configured as or otherwise support a means for transmitting DMRSs via the first TRP and the second TRP according to a second DMRS configuration of the set of DMRS configurations based on the second transmission mode.

In some examples, the downlink transmission component 1225 may be configured as or otherwise support a means for transmitting, via the first TRP and the second TRP, downlink data, based on transmitting the DMRSs from the first TRP and the second TRP.

In some examples, the control transmission component 1245 may be configured as or otherwise support a means for transmitting control signaling indicating for the UE to use concurrently the first DMRS configuration and the second DMRS configuration.

In some examples, the control transmission component 1245 may be configured as or otherwise support a means for transmitting an indication of a correspondence between the first DMRS configuration and the first transmission mode.

In some examples, the control transmission component 1245 may be configured as or otherwise support a means for transmitting an indication of a correspondence between the second DMRS configuration and the second transmission mode.

In some examples, the DMRS configuration component 1230 may be configured as or otherwise support a means for transmitting an indication of the set of DMRS configurations, including the first DMRS configuration and the second DMRS configuration.

In some examples, the control transmission component 1245 may be configured as or otherwise support a means for transmitting control signaling activating the first DMRS configuration.

In some examples, the control transmission component 1245 may be configured as or otherwise support a means for transmitting control signaling activating the second DMRS configuration.

In some examples, the first DMRS configuration corresponds to a first code division multiplexing group, or a first set of DMRS ports, or a combination thereof, and the second DMRS configuration corresponds to a second code division multiplexing group, or a second set of DMRS ports, or a combination thereof.

In some examples, the control transmission component 1245 may be configured as or otherwise support a means for transmitting first control signaling indicating the first transmission mode, the communicating via the first TRP and the second TRP based on the transmitted control signaling. In some examples, the control transmission component 1245 may be configured as or otherwise support a means for transmitting second control signaling indicating the second transmission mode, the transmitted indication to switch to the second transmission mode including the transmitted second control signaling indicating the second transmission mode.

In some examples, the first control signaling includes MAC-CE signaling, or a DCI message, or a combination thereof. In some examples, the second control signaling includes MAC-CE signaling, or a DCI message, or a combination thereof, and.

In some examples, the first transmission mode includes a first single frequency network transmission scheme with precompensation, a second single frequency network transmission scheme with precompensation, the second single frequency network transmission scheme without precompensation, a dynamic point selection mode, a transparent single frequency network transmission scheme, or a spatial domain multiplexing scheme. In some examples, the second transmission mode includes the first single frequency network transmission scheme without precompensation, the second single frequency network transmission scheme with precompensation, the second single frequency network transmission scheme without precompensation, the dynamic point selection mode, or the spatial domain multiplexing scheme.

Figure 13:
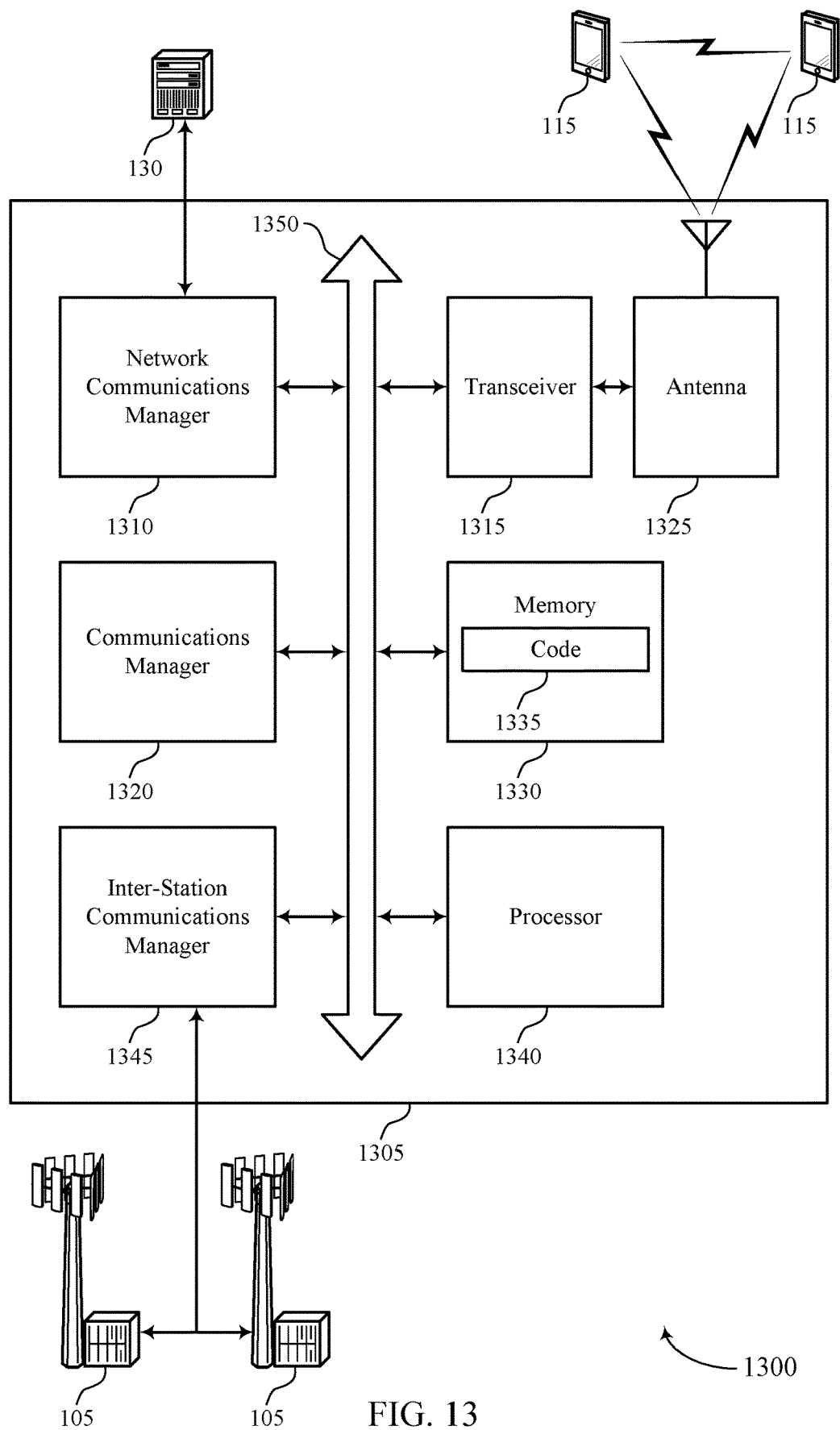
FIG. 13 shows a diagram of a system including a device that supports dynamic DMRS configuration signaling for adaptation with different transmission modes in accordance with aspects of the present disclosure.

FIG. 13 shows a diagram of a system 1300 including a device 1305 that supports dynamic DMRS configuration signaling for adaptation with different transmission modes in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dynamic DMRS configuration signaling for adaptation with different transmission modes). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for communicating with a UE via a first TRP and a second TRP of the base station according to a first transmission mode for multiple TRPs. The communications manager 1320 may be configured as or otherwise support a means for transmitting DMRSs via the first TRP and the second TRP according to a first DMRS configuration of a set of DMRS configurations. The communications manager 1320 may be configured as or otherwise support a means for transmitting, to the UE, an indication to switch to a second transmission mode for multiple TRPs. The communications manager 1320 may be configured as or otherwise support a means for transmitting DMRSs via the first TRP and the second TRP according to a second DMRS configuration of the set of DMRS configurations based on the second transmission mode.

By including or configuring the communications manager 1320 in accordance with examples as described herein, the device 1305 may support techniques for improved communication reliability, and reduced latency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of dynamic DMRS configuration signaling for adaptation with different transmission modes as described herein, or the processor 1340 and the memory 1330 may be otherwise configured to perform or support such operations.

Figure 14:
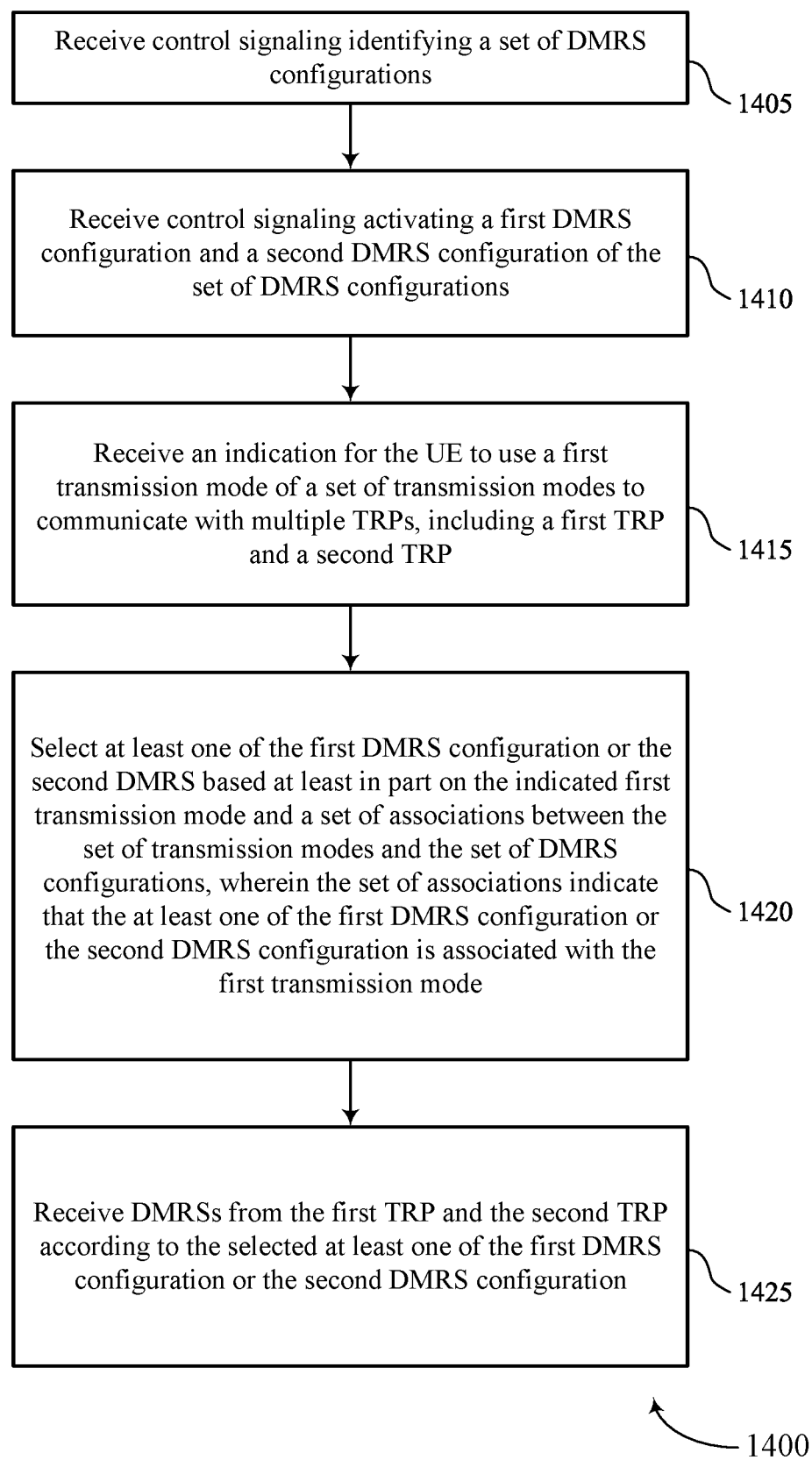
FIGS. 14 through 17 show flowcharts illustrating methods that support dynamic DMRS configuration signaling for adaptation with different transmission modes in accordance with aspects of the present disclosure.

FIG. 14 shows a flowchart illustrating a method 1400 that supports dynamic DMRS configuration signaling for adaptation with different transmission modes in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling identifying a set of DMRS configurations. The operations of 1405 may be performed in accordance with examples as disclosed herein. In some examples, aspects of the operations of 1405 may be performed by a control reception component 825 as described with reference to FIG. 8.

At 1410, the method may include receiving control signaling activating a first DMRS configuration and a second DMRS configuration of the set of DMRS configurations. The operations of 1410 may be performed in accordance with examples as disclosed herein. In some examples, aspects of the operations of 1410 may be performed by a DMRS activation component 830 as described with reference to FIG. 8.

At 1415, the method may include receiving an indication for the UE to use a first transmission mode of a set of transmission modes to communicate with multiple TRPs, including a first TRP and a second TRP. The operations of 1415 may be performed in accordance with examples as disclosed herein. In some examples, aspects of the operations of 1415 may be performed by a transmission mode indication component 835 as described with reference to FIG. 8.

At 1420, the method may include selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The operations of 1420 may be performed in accordance with examples as disclosed herein. In some examples, aspects of the operations of 1420 may be performed by a DMRS configuration component 840 as described with reference to FIG. 8.

At 1425, the method may include receiving DMRSs from the first TRP and the second TRP according to the selected at least one of the first DMRS configuration or the second DMRS configuration. The operations of 1425 may be performed in accordance with examples as disclosed herein. In some examples, aspects of the operations of 1425 may be performed by a DMRS reception component 845 as described with reference to FIG. 8.

Figure 15:
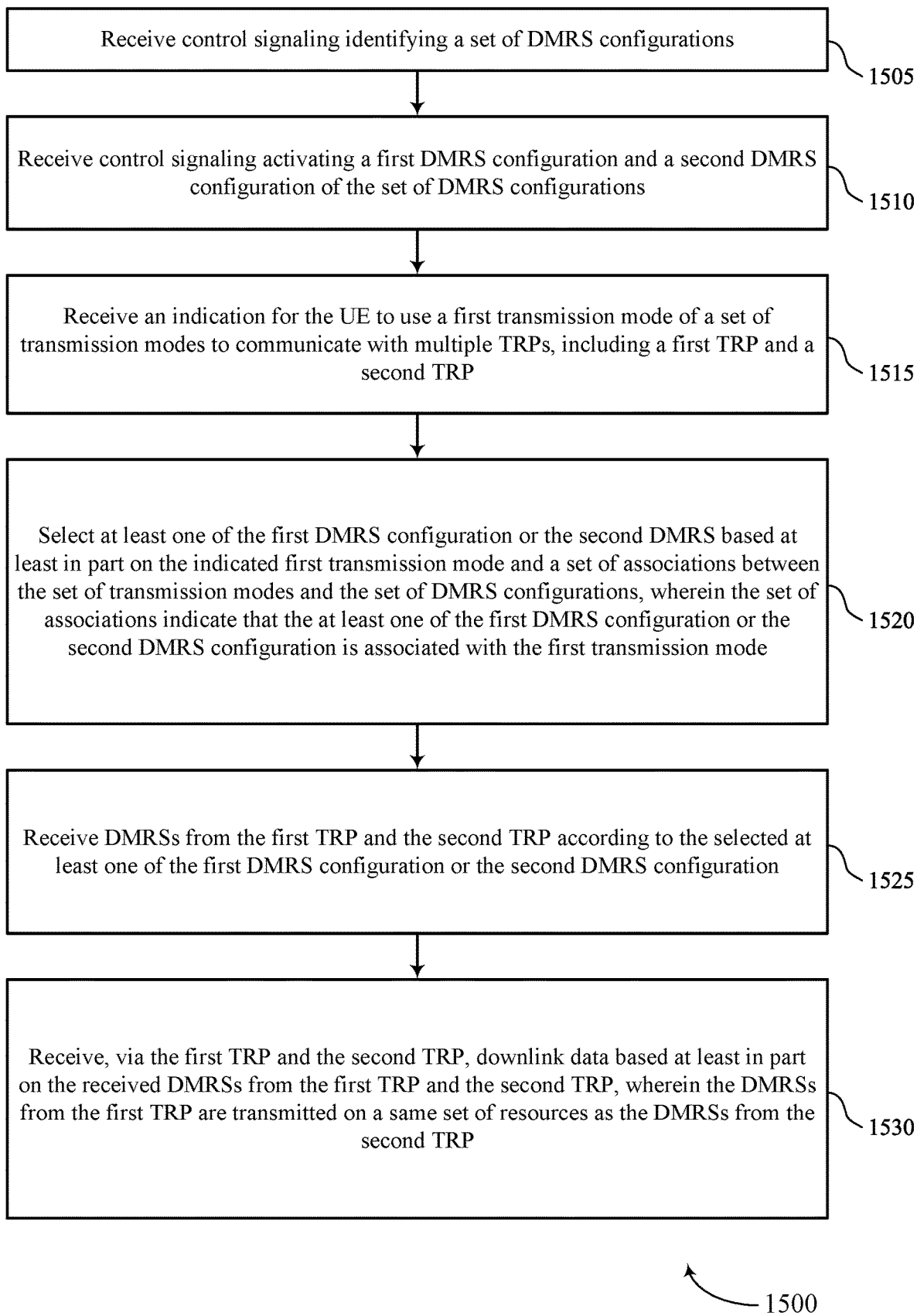

FIG. 15 shows a flowchart illustrating a method 1500 that supports dynamic DMRS configuration signaling for adaptation with different transmission modes in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling identifying a set of DMRS configurations. The operations of 1505 may be performed in accordance with examples as disclosed herein. In some examples, aspects of the operations of 1505 may be performed by a control reception component 825 as described with reference to FIG. 8.

At 1510, the method may include receiving control signaling activating a first DMRS configuration and a second DMRS configuration of the set of DMRS configurations. The operations of 1510 may be performed in accordance with examples as disclosed herein. In some examples, aspects of the operations of 1510 may be performed by a DMRS activation component 830 as described with reference to FIG. 8.

At 1515, the method may include receiving an indication for the UE to use a first transmission mode of a set of transmission modes to communicate with multiple TRPs, including a first TRP and a second TRP. The operations of 1515 may be performed in accordance with examples as disclosed herein. In some examples, aspects of the operations of 1515 may be performed by a transmission mode indication component 835 as described with reference to FIG. 8.

At 1520, the method may include selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The operations of 1520 may be performed in accordance with examples as disclosed herein. In some examples, aspects of the operations of 1520 may be performed by a DMRS configuration component 840 as described with reference to FIG. 8.

At 1525, the method may include receiving DMRSs from the first TRP and the second TRP according to the selected at least one of the first DMRS configuration or the second DMRS configuration. The operations of 1525 may be performed in accordance with examples as disclosed herein. In some examples, aspects of the operations of 1525 may be performed by a DMRS reception component 845 as described with reference to FIG. 8.

At 1530, the method may include receiving, via the first TRP and the second TRP, downlink data based on the received DMRSs from the first TRP and the second TRP, where the DMRSs from the first TRP are transmitted on a same set of resources as the DMRSs from the second TRP. The operations of 1530 may be performed in accordance with examples as disclosed herein. In some examples, aspects of the operations of 1530 may be performed by a downlink reception component 850 as described with reference to FIG. 8.

Figure 16:
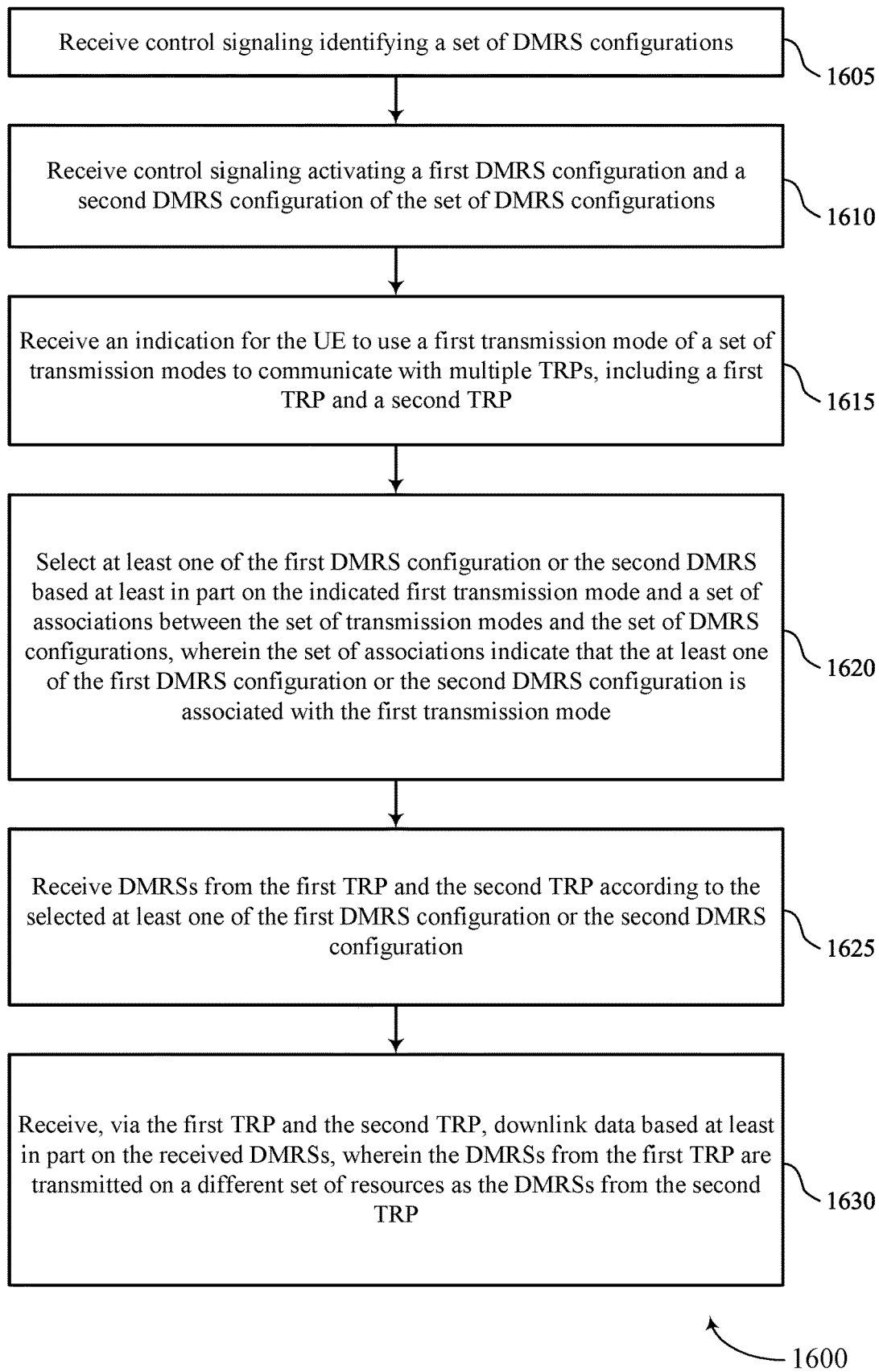

FIG. 16 shows a flowchart illustrating a method 1600 that supports dynamic DMRS configuration signaling for adaptation with different transmission modes in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving control signaling identifying a set of DMRS configurations. The operations of 1605 may be performed in accordance with examples as disclosed herein. In some examples, aspects of the operations of 1605 may be performed by a control reception component 825 as described with reference to FIG. 8.

At 1610, the method may include receiving control signaling activating a first DMRS configuration and a second DMRS configuration of the set of DMRS configurations. The operations of 1610 may be performed in accordance with examples as disclosed herein. In some examples, aspects of the operations of 1610 may be performed by a DMRS activation component 830 as described with reference to FIG. 8.

At 1615, the method may include receiving an indication for the UE to use a first transmission mode of a set of transmission modes to communicate with multiple TRPs, including a first TRP and a second TRP. The operations of 1615 may be performed in accordance with examples as disclosed herein. In some examples, aspects of the operations of 1615 may be performed by a transmission mode indication component 835 as described with reference to FIG. 8.

At 1620, the method may include selecting at least one of the first DMRS configuration or the second DMRS configuration based on the indicated first transmission mode and a set of associations between the set of transmission modes and the set of DMRS configurations, where the set of associations indicate that the at least one of the first DMRS configuration or the second DMRS configuration is associated with the first transmission mode. The operations of 1620 may be performed in accordance with examples as disclosed herein. In some examples, aspects of the operations of 1620 may be performed by a DMRS configuration component 840 as described with reference to FIG. 8.

At 1625, the method may include receiving DMRSs from the first TRP and the second TRP according to the selected at least one of the first DMRS configuration or the second DMRS configuration. The operations of 1625 may be performed in accordance with examples as disclosed herein. In some examples, aspects of the operations of 1625 may be performed by a DMRS reception component 845 as described with reference to FIG. 8.

At 1630, the method may include receiving, via the first TRP and the second TRP, downlink data based on the received DMRSs, where the DMRSs from the first TRP are transmitted on a different set of resources as the DMRSs from the second TRP. The operations of 1630 may be performed in accordance with examples as disclosed herein. In some examples, aspects of the operations of 1630 may be performed by a downlink reception component 850 as described with reference to FIG. 8.

Figure 17:
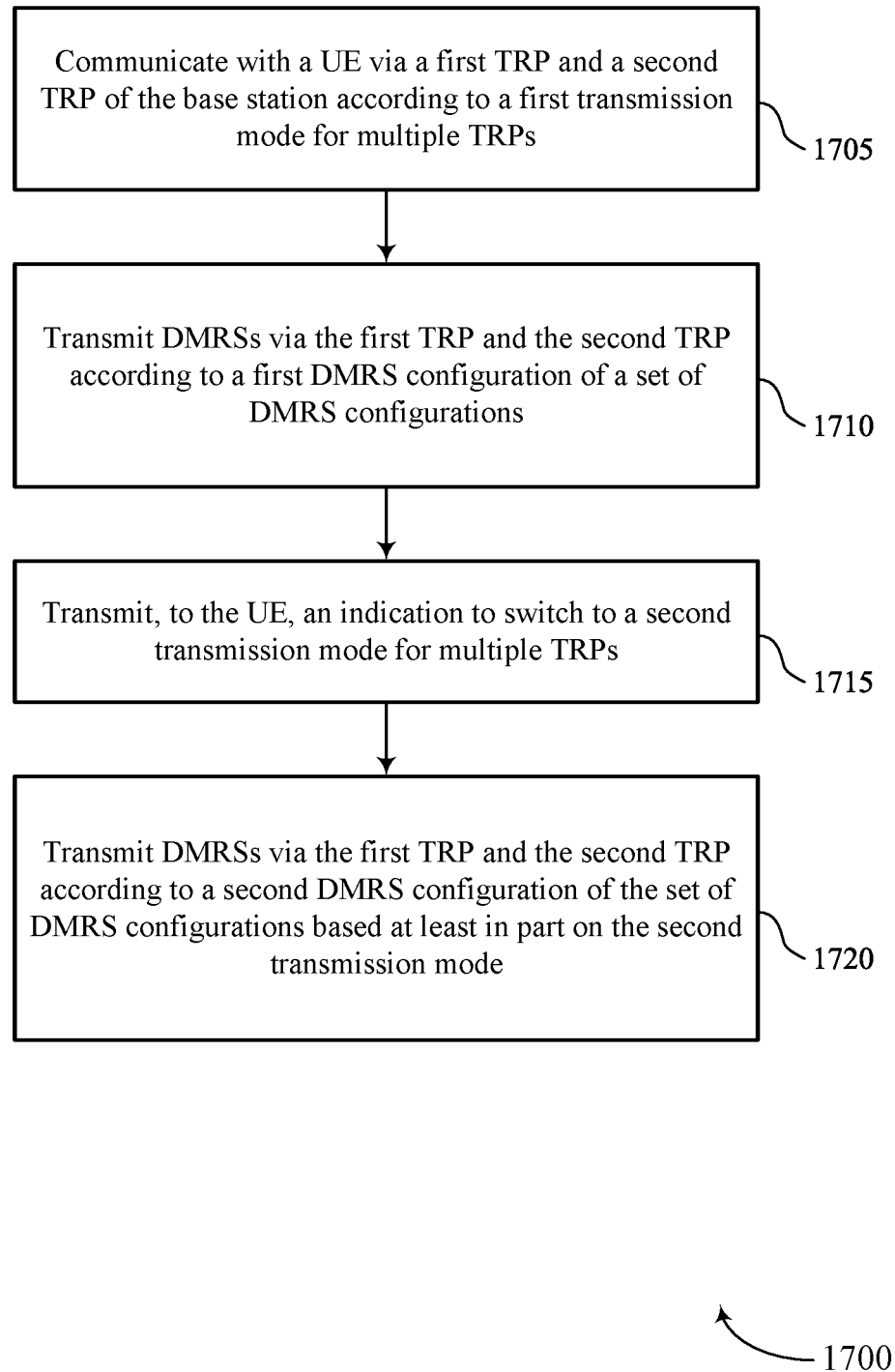

FIG. 17 shows a flowchart illustrating a method 1700 that supports dynamic DMRS configuration signaling for adaptation with different transmission modes in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include communicating with a UE via a first TRP and a second TRP of the base station according to a first transmission mode for multiple TRPs. The operations of 1705 may be performed in accordance with examples as disclosed herein. In some examples, aspects of the operations of 1705 may be performed by a downlink transmission component 1225 as described with reference to FIG. 12.

At 1710, the method may include transmitting DMRSs via the first TRP and the second TRP according to a first DMRS configuration of a set of DMRS configurations. The operations of 1710 may be performed in accordance with examples as disclosed herein. In some examples, aspects of the operations of 1710 may be performed by a DMRS configuration component 1230 as described with reference to FIG. 12.

At 1715, the method may include transmitting, to the UE, an indication to switch to a second transmission mode for multiple TRPs. The operations of 1715 may be performed in accordance with examples as disclosed herein. In some examples, aspects of the operations of 1715 may be performed by a transmission mode component 1235 as described with reference to FIG. 12.

At 1720, the method may include transmitting DMRSs via the first TRP and the second TRP according to a second DMRS configuration of the set of DMRS configurations based on the second transmission mode. The operations of 1720 may be performed in accordance with examples as disclosed herein. In some examples, aspects of the operations of 1720 may be performed by a DMRS transmission component 1240 as described with reference to FIG. 12.

The following provides an overview of aspects of the present disclosure:

Aspect 1: A method for wireless communication at a UE, comprising: receiving control signaling identifying a set of demodulation reference signal configurations; receiving control signaling activating a first demodulation reference signal configuration and a second demodulation reference signal configuration of the set of demodulation reference signal configurations; receiving an indication for the UE to use a first transmission mode of a set of transmission modes to communicate with multiple transmission reception points, including a first transmission reception point and a second transmission reception point; selecting at least one of the first demodulation reference signal configuration or the second demodulation reference signal configuration based at least in part on the indicated first transmission mode and a set of associations between the set of transmission modes and the set of demodulation reference signal configurations, wherein the set of associations indicate that the at least one of the first demodulation reference signal configuration or the second demodulation reference signal configuration is associated with the first transmission mode; and receiving demodulation reference signals from the first transmission reception point and the second transmission reception point according to the selected at least one of the first demodulation reference signal configuration or the second demodulation reference signal configuration.

Aspect 2: The method of aspect 1, further comprising: receiving, via the first transmission reception point and the second transmission reception point, downlink data based at least in part on the received demodulation reference signals from the first transmission reception point and the second transmission reception point, wherein the demodulation reference signals from the first transmission reception point are transmitted on a same set of resources as the demodulation reference signals from the second transmission reception point.

Aspect 3: The method of 1, further comprising: receiving, via the first transmission reception point and the second transmission reception point, downlink data based at least in part on the received demodulation reference signals, wherein the demodulation reference signals from the first transmission reception point are transmitted on a different set of resources as the demodulation reference signals from the second transmission reception point.

Aspect 4: The method of any of aspects 1 through 3, further comprising: transmitting an indication of a capability of the UE to use concurrently different demodulation reference signal configurations for different transmission reception points and to receive different demodulation reference signal signals concurrently when multi transmission reception point transmission is used; and receiving, at least in part in response to the transmitted indication of the capability, control signaling indicating for the UE to use concurrently the first demodulation reference signal configuration for the first transmission reception point and the second demodulation reference signal configuration for the second transmission reception point.

Aspect 5: The method of any of aspects 1 through 4, further comprising: receiving an indicator that identifies a demodulation reference signal configuration that is being activated as the first or the second demodulation reference signal configuration.

Aspect 6: The method of aspect 5, further comprising: identifying a set of associations between the first and the second activated demodulation reference signal configurations of the set of demodulation reference signal configurations and a first and a second set of one or more transmission mode options; and identifying which demodulation reference signal configuration to be assumed at the UE in response to the received indicator and according to the set of associations defining that the first demodulation reference signal configuration is associated with a transmission mode option of the first set of transmission mode options, and that the second demodulation reference signal configuration is associated with a transmission mode option of the second set of transmission mode options.

Aspect 7: The method of aspect 5, further comprising: identifying a set of associations between the first and the second activated demodulation reference signal configurations of the set of demodulation reference signal configurations and the multiple transmission reception points; and identifying, which demodulation reference signal configuration to be assumed per transmission reception point in response to a received indication to switch to a second transmission mode, the received indicator, and according to the set of associations defining that the first demodulation reference signal configuration is associated with the first transmission reception point for the second transmission mode, and that the second demodulation reference signal configuration is associated with the second transmission reception point for the second transmission mode.

Aspect 8: The method of aspect 5, wherein identifying a set of associations between the first and the second activated demodulation reference signal configurations of the set of demodulation reference signal configurations, the multiple transmission reception points, and a set of demodulation reference signal code division multiplexing groups associated with the transmission reception points and correspondingly with the set of demodulation reference signal configurations further comprises; identifying, which demodulation reference signal configuration to be assumed per transmission reception point in response to a received indication to switch to a second transmission mode, the received indicator, and according to the set of associations defining that the first demodulation reference signal configuration is associated with a first transmission configuration indicator state that corresponds to the first transmission reception point, and defining that the second demodulation reference signal configuration is associated with a second transmission configuration indicator state that corresponds to the second transmission reception point; identifying that the first demodulation reference signal configuration is associated with a first code division multiplexing group of the set of code division multiplexing groups based at least in part on the first code division multiplexing group being associated with the first transmission configuration indicator state; and identifying that the second demodulation reference signal configuration is associated with a second code division multiplexing group of the set of code division multiplexing groups based at least in part on the second code division multiplexing group being associated with the second transmission configuration indicator state.

Aspect 9: The method of any of aspects 5 through 8, wherein the first and the second demodulation reference signal configuration is valid for the first and the second set correspondingly of one or more transmission modes until a subsequent activating control signaling and the corresponding indicator that activates a different demodulation reference signal configuration for the first or the second demodulation reference signal configuration or for both of them is received by the UE.

Aspect 10: The method of any of aspects 5 through 9, wherein a default or a single RRC configured demodulation reference signal configuration is valid for any transmission mode until receiving the first control signaling activating the first or the second or both demodulation reference signal configurations.

Aspect 11: The method of any of aspects 1 through 10, wherein receiving the indication for the UE to use a first transmission mode of the set of transmission modes comprises: receiving medium access control-control element signaling or a downlink control information message that includes the indication for the UE to use a first transmission mode of the set of transmission modes.

Aspect 12: The method of any of aspects 1 through 11, further comprising: receiving, from a base station, a control message comprising an indication that the UE is to reactivate the first or the second or both demodulation reference signal configurations with the corresponding indicator having a first value that is associated with the first set of transmission modes or the first transmission reception point, wherein a second value of the indicator is associated with the second set of transmission modes or the second transmission reception point.

Aspect 13: A method for wireless communication at a base station, comprising: communicating with a UE via a first transmission reception point and a second transmission reception point of the base station according to a first transmission mode for multiple transmission reception points; transmitting demodulation reference signals via the first transmission reception point and the second transmission reception point according to a first demodulation reference signal configuration of a set of demodulation reference signal configurations; transmitting, to the UE, an indication to switch to a second transmission mode for multiple transmission reception points; and transmitting demodulation reference signals via the first transmission reception point and the second transmission reception point according to a second demodulation reference signal configuration of the set of demodulation reference signal configurations based at least in part on the second transmission mode.

Aspect 14: The method of aspect 13, further comprising: transmitting, via the first transmission reception point and the second transmission reception point, downlink data, based at least in part on transmitting the demodulation reference signals from the first transmission reception point and the second transmission reception point.

Aspect 15: The method of any of aspects 13 through 14, further comprising: transmitting control signaling indicating for the UE to use concurrently the first demodulation reference signal configuration and the second demodulation reference signal configuration.

Aspect 16: The method of any of aspects 13 through 15, further comprising: transmitting an indication of a correspondence between the first demodulation reference signal configuration and the first transmission mode.

Aspect 17: The method of any of aspects 13 through 16, further comprising: transmitting an indication of a correspondence between the second demodulation reference signal configuration and the second transmission mode.

Aspect 18: The method of any of aspects 13 through 17, further comprising: transmitting an indication of the set of demodulation reference signal configurations, including the first demodulation reference signal configuration and the second demodulation reference signal configuration.

Aspect 19: The method of any of aspects 13 through 18, further comprising: transmitting control signaling activating the first demodulation reference signal configuration.

Aspect 20: The method of any of aspects 13 through 19, further comprising: transmitting control signaling activating the second demodulation reference signal configuration.

Aspect 21: The method of any of aspects 13 through 20, wherein the first demodulation reference signal configuration corresponds to a first code division multiplexing group, or a first set of demodulation reference signal ports, or a combination thereof, and the second demodulation reference signal configuration corresponds to a second code division multiplexing group, or a second set of demodulation reference signal ports, or a combination thereof.

Aspect 22: The method of any of aspects 13 through 21, further comprising: transmitting first control signaling indicating the first transmission mode, the communicating via the first transmission reception point and the second transmission reception point based at least in part on the transmitted control signaling; and transmitting second control signaling indicating the second transmission mode, the transmitted indication to switch to the second transmission mode comprising the transmitted second control signaling indicating the second transmission mode.

Aspect 23: The method of aspect 22, wherein the first control signaling comprises medium access control-control element signaling, or a downlink control information message, or a combination thereof, and the second control signaling comprises medium access control-control element signaling, or a downlink control information message, or a combination thereof, and.

Aspect 24: The method of any of aspects 13 through 23, wherein the first transmission mode comprises a first single frequency network transmission scheme with precompensation, a second single frequency network transmission scheme with precompensation, the second single frequency network transmission scheme without precompensation, a dynamic point selection mode, a transparent single frequency network transmission scheme, or a spatial domain multiplexing scheme; and the second transmission mode comprises the first single frequency network transmission scheme without precompensation, the second single frequency network transmission scheme with precompensation, the second single frequency network transmission scheme without precompensation, the dynamic point selection mode, or the spatial domain multiplexing scheme.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving first control signaling identifying a set of demodulation reference signal configurations;
receiving second control signaling activating a first demodulation reference signal configuration and a second demodulation reference signal configuration of the set of demodulation reference signal configurations;
receiving an indication for the UE to use a first transmission mode of a set of transmission modes to communicate with multiple transmission reception points, including a first transmission reception point and a second transmission reception point;
selecting at least one of the first demodulation reference signal configuration or the second demodulation reference signal configuration based at least in part on the indicated first transmission mode and a set of associations between the set of transmission modes and the set of demodulation reference signal configurations, wherein the set of associations indicate that the at least one of the first demodulation reference signal configuration or the second demodulation reference signal configuration is associated with the first transmission mode; and receiving demodulation reference signals from the first transmission reception point and the second transmission reception point according to the selected at least one of the first demodulation reference signal configuration or the second demodulation reference signal configuration.

2. The method of claim 1, further comprising:
receiving, via the first transmission reception point and the second transmission reception point, downlink data based at least in part on the received demodulation reference signals from the first transmission reception point and the second transmission reception point, wherein the demodulation reference signals from the first transmission reception point are transmitted on a same set of resources as the demodulation reference signals from the second transmission reception point.

3. The method of claim 1, further comprising:
receiving, via the first transmission reception point and the second transmission reception point, downlink data based at least in part on the received demodulation reference signals, wherein the demodulation reference signals from the first transmission reception point are transmitted on a different set of resources as the demodulation reference signals from the second transmission reception point.

4. The method of claim 1, further comprising:
transmitting an indication of a capability of the UE to use concurrently different demodulation reference signal configurations for different transmission reception points and to receive different demodulation reference signal signals concurrently when multi transmission reception point transmission is used; and
receiving, at least in part in response to the transmitted indication of the capability, third control signaling indicating for the UE to use the first demodulation reference signal configuration for the first transmission reception point and the second demodulation reference signal configuration for the second transmission reception point concurrently.

5. The method of claim 1, further comprising:
receiving an indicator that identifies a demodulation reference signal configuration that is being activated as the first demodulation reference signal configuration or the second demodulation reference signal configuration.

6. The method of claim 5, further comprising:
identifying that the set of associations is between the first activated demodulation reference signal configuration and the second activated demodulation reference signal configuration of the set of demodulation reference signal configurations and a first set of one or more transmission mode options and a second set of one or more transmission mode options; and
identifying which demodulation reference signal configuration to be assumed at the UE in response to the received indicator and according to the set of associations defining that the first demodulation reference signal configuration is associated with a first transmission mode option of the first set of one or more transmission mode options, and that the second demodulation reference signal configuration is associated with a second transmission mode option of the second set of one or more transmission mode options.

7. The method of claim 5, further comprising:
identifying that the set of associations is between the first activated demodulation reference signal configuration and the second activated demodulation reference signal configuration of the set of demodulation reference signal configurations and the multiple transmission reception points; and
identifying which demodulation reference signal configuration to be assumed per transmission reception point in response to a received indication to switch to a second transmission mode, the received indicator, and according to the set of associations defining that the first demodulation reference signal configuration is associated with the first transmission reception point for the second transmission mode, and that the second demodulation reference signal configuration is associated with the second transmission reception point for the second transmission mode.

8. The method of claim 5, further comprising:
identifying that the set of associations is between the first activated demodulation reference signal configuration and the second activated demodulation reference signal configuration of the set of demodulation reference signal configurations, the multiple transmission reception points, and a set of code division multiplexing groups associated with the multiple transmission reception points and correspondingly with the set of demodulation reference signal configurations;
identifying which demodulation reference signal configuration to be assumed per transmission reception point in response to a received indication to switch to a second transmission mode, the received indicator, and according to the set of associations defining that the first demodulation reference signal configuration is associated with a first transmission configuration indicator state that corresponds to the first transmission reception point, and defining that the second demodulation reference signal configuration is associated with a second transmission configuration indicator state that corresponds to the second transmission reception point;
identifying that the first demodulation reference signal configuration is associated with a first code division multiplexing group of the set of code division multiplexing groups based at least in part on the first code division multiplexing group being associated with the first transmission configuration indicator state; and
identifying that the second demodulation reference signal configuration is associated with a second code division multiplexing group of the set of code division multiplexing groups based at least in part on the second code division multiplexing group being associated with the second transmission configuration indicator state.

9. The method of claim 5, wherein the first demodulation reference signal configuration and the second demodulation reference signal configuration is valid for the first transmission mode and the second transmission mode until a subsequent activating control signaling and the indicator activates a different demodulation reference signal configuration for the first demodulation reference signal configuration or the second demodulation reference signal configuration or for both of them is received by the UE.

10. The method of claim 5, wherein a default or a single RRC configured demodulation reference signal configuration is valid for any transmission mode until receiving the first control signaling activating the first demodulation reference signal configuration or the second demodulation reference signal configuration or both.

11. The method of claim 1, wherein receiving the indication for the UE to use the first transmission mode of the set of transmission modes comprises:

receiving medium access control-control element signaling or a downlink control information message that includes the indication for the UE to use the first transmission mode of the set of transmission modes.

12. The method of claim 1, further comprising:
receiving a control message comprising an indication that the UE is to reactivate the first demodulation reference signal configuration or the second demodulation reference signal configuration or both with the indicator having a first value that is associated with the first transmission mode or the first transmission reception point, wherein a second value of the indicator is associated with a second transmission mode or the second transmission reception point.

13. A method for wireless communication at a base station, comprising:
communicating with a user equipment (UE) via a first transmission reception point and a second transmission reception point of the base station according to a first transmission mode for multiple transmission reception points;
transmitting first demodulation reference signals via the first transmission reception point and the second transmission reception point according to a first demodulation reference signal configuration of a set of demodulation reference signal configurations;
transmitting an indication to switch to a second transmission mode for the multiple transmission reception points; and
transmitting second demodulation reference signals via the first transmission reception point and the second transmission reception point according to a second demodulation reference signal configuration of the set of demodulation reference signal configurations based at least in part on the second transmission mode.

14. The method of claim 13, further comprising:
transmitting, via the first transmission reception point and the second transmission reception point, downlink data based at least in part on transmitting the demodulation reference signals from the first transmission reception point and the second transmission reception point.

15. The method of claim 13, further comprising:
transmitting control signaling indicating for the UE to use the first demodulation reference signal configuration and the second demodulation reference signal configuration concurrently.

16. The method of claim 13, further comprising:
transmitting an indication of a correspondence between the first demodulation reference signal configuration and the first transmission mode.

17. The method of claim 13, further comprising:
transmitting an indication of a correspondence between the second demodulation reference signal configuration and the second transmission mode.

18. The method of claim 13, further comprising:
transmitting an indication of the set of demodulation reference signal configurations, including the first demodulation reference signal configuration and the second demodulation reference signal configuration.

19. The method of claim 13, further comprising:
transmitting control signaling activating the first demodulation reference signal configuration.

20. The method of claim 13, further comprising:
transmitting control signaling activating the second demodulation reference signal configuration.

21. The method of claim 13, wherein the first demodulation reference signal configuration corresponds to a first code division multiplexing group, or a first set of demodulation reference signal ports, or a combination thereof, and the second demodulation reference signal configuration corresponds to a second code division multiplexing group, or a second set of demodulation reference signal ports, or a combination thereof.

22. The method of claim 13, further comprising:
transmitting first control signaling indicating the first transmission mode, the communicating via the first transmission reception point and the second transmission reception point based at least in part on the transmitted control signaling; and
transmitting second control signaling indicating the second transmission mode, the transmitted indication to switch to the second transmission mode comprising the transmitted second control signaling indicating the second transmission mode.

23. The method of claim 22, wherein:
the first control signaling comprises first medium access control-control element signaling, or a first downlink control information message, or a combination thereof, and
the second control signaling comprises second medium access control-control element signaling, or a second downlink control information message, or a combination thereof.

24. The method of claim 13, wherein:
the first transmission mode comprises a first single frequency network transmission scheme with precompensation, a second single frequency network transmission scheme with precompensation, the second single frequency network transmission scheme without precompensation, a dynamic point selection mode, a transparent single frequency network transmission scheme, or a spatial domain multiplexing scheme; and
the second transmission mode comprises the first single frequency network transmission scheme without precompensation, the second single frequency network transmission scheme with precompensation, the second single frequency network transmission scheme without precompensation, the dynamic point selection mode, or the spatial domain multiplexing scheme.

25. An apparatus for wireless communication at a user equipment (UE), comprising:
a processor;
memory coupled with the processor; and
instructions stored in the memory and executable by the processor to cause the apparatus to:
receive first control signaling identifying a set of demodulation reference signal configurations;
receive second control signaling activating a first demodulation reference signal configuration and a second demodulation reference signal configuration of the set of demodulation reference signal configurations;
receive an indication for the UE to use a first transmission mode of a set of transmission modes to communicate with multiple transmission reception points, including a first transmission reception point and a second transmission reception point;
select at least one of the first demodulation reference signal configuration or the second demodulation reference signal configuration based at least in part on the indicated first transmission mode and a set of associations between the set of transmission modes and the set of demodulation reference signal configurations, wherein the set of associations indicate that the at least one of the first demodulation reference signal configuration or the second demodulation reference signal configuration is associated with the first transmission mode; and receive demodulation reference signals from the first transmission reception point and the second transmission reception point according to the selected at least one of the first demodulation reference signal configuration or the second demodulation reference signal configuration.

26. The apparatus of claim 25, wherein the instructions are further executable by the processor to cause the apparatus to:

receive, via the first transmission reception point and the second transmission reception point, downlink data based at least in part on the received demodulation reference signals from the first transmission reception point and the second transmission reception point, wherein the demodulation reference signals from the first transmission reception point are transmitted on a same set of resources as the demodulation reference signals from the second transmission reception point.

27. The apparatus of claim 25, wherein the instructions are further executable by the processor to cause the apparatus to:

receive, via the first transmission reception point and the second transmission reception point, downlink data based at least in part on the received demodulation reference signals, wherein the demodulation reference signals from the first transmission reception point are transmitted on a different set of resources as the demodulation reference signals from the second transmission reception point.

28. The apparatus of claim 25, wherein the instructions are further executable by the processor to cause the apparatus to:

transmit an indication of a capability of the UE to use concurrently different demodulation reference signal configurations for different transmission reception points and to receive different demodulation reference signal signals concurrently when multi transmission reception point transmission is used; and receive, at least in part in response to the transmitted indication of the capability, third control signaling indicating for the UE to use the first demodulation reference signal configuration for the first transmission reception point and the second demodulation reference signal configuration for the second transmission reception point concurrently.

29. An apparatus for wireless communication at a base station, comprising:

a processor;

memory coupled with the processor; and instructions stored in the memory and executable by the processor to cause the apparatus to:

communicate with a user equipment (UE) via a first transmission reception point and a second transmission reception point of the base station according to a first transmission mode for multiple transmission reception points;

transmit first demodulation reference signals via the first transmission reception point and the second transmission reception point according to a first demodulation reference signal configuration of a set of demodulation reference signal configurations;

transmit an indication to switch to a second transmission mode for the multiple transmission reception points; and transmit second demodulation reference signals via the first transmission reception point and the second transmission reception point according to a second demodulation reference signal configuration of the set of demodulation reference signal configurations based at least in part on the second transmission mode.

30. The apparatus of claim 29, wherein the instructions are further executable by the processor to cause the apparatus to:

transmit, via the first transmission reception point and the second transmission reception point, downlink data based at least in part on transmitting the first demodulation reference signals, the second demodulation reference signals, or both from the first transmission reception point and the second transmission reception point.

* * * * *